US012596195B2

(12) United States Patent
Han et al.

(10) Patent No.: US 12,596,195 B2
(45) Date of Patent: Apr. 7, 2026

(54) ELECTRONIC DEVICE AND SENSOR CONTROL METHOD FOR CONTROLLING LIGHT SENSOR BASED ON STATUS OF TIME OF FLIGHT SENSOR

(71) Applicant: Huawei Technologies Co., Ltd., Shenzhen (CN)

(72) Inventors: Ping Han, Shanghai (CN); Haowei Jiang, Shanghai (CN); Li Kang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1063 days.

(21) Appl. No.: 17/642,429

(22) PCT Filed: Sep. 2, 2020

(86) PCT No.: PCT/CN2020/113098
§ 371 (c)(1),
(2) Date: Mar. 11, 2022

(87) PCT Pub. No.: WO2021/047435
PCT Pub. Date: Mar. 18, 2021

(65) Prior Publication Data
US 2022/0342074 A1 Oct. 27, 2022

(30) Foreign Application Priority Data
Sep. 12, 2019 (CN) ......................... 201910866729.X

(51) Int. Cl.
*G01S 17/86* (2020.01)
*G01J 1/42* (2006.01)
(Continued)

(52) U.S. Cl.
CPC ............. *G01S 17/86* (2020.01); *G01J 1/4204* (2013.01); *G01S 17/08* (2013.01); *G01S 17/10* (2013.01);
(Continued)

(58) Field of Classification Search
CPC ........ G01S 17/894; G01S 17/10; G01S 17/86; G01S 17/08; G01S 17/89; G01J 1/4204;
(Continued)

(56) References Cited

U.S. PATENT DOCUMENTS

| 2010/0283394 | A1 | 11/2010 | Ong |
| 2014/0152974 | A1 | 6/2014 | Ko |
(Continued)

FOREIGN PATENT DOCUMENTS

| CN | 103852754 A | 6/2014 |
| CN | 104375721 A | 2/2015 |
(Continued)

*Primary Examiner* — Georgia Y Epps
*Assistant Examiner* — Erin R Garber
(74) *Attorney, Agent, or Firm* — Conley Rose, P.C.

(57) ABSTRACT

An electronic device includes a time of flight (ToF) sensor, a proximity sensor, and an ambient light sensor. The ToF sensor, the proximity sensor, and the ambient light sensor are located on a same side of the electronic device. When the ToF sensor is turned on, a light sensor (for example, the proximity sensor and/or the ambient light sensor) may be controlled to be turned off, and when the ToF sensor is turned off, the light sensor may be controlled to be turned on. Alternatively, when the ToF sensor is turned on, data measured by a light sensor is discarded, and when the ToF sensor is turned off, a corresponding function is implemented based on data measured by the light sensor.

20 Claims, 11 Drawing Sheets

(51) Int. Cl.

| | |
|---|---|
| *G01S 17/08* | (2006.01) |
| *G01S 17/10* | (2020.01) |
| *G01S 17/894* | (2020.01) |
| *H04N 5/58* | (2006.01) |
| *G06F 21/32* | (2013.01) |

(52) U.S. Cl.
CPC ............. *G01S 17/894* (2020.01); *H04N 5/58*
(2013.01); *G06F 21/32* (2013.01)

(58) Field of Classification Search
CPC ........... H04N 5/58; G06F 21/32; G06T 7/514;
G06V 20/64; G06V 40/172
See application file for complete search history.

(56) References Cited

U.S. PATENT DOCUMENTS

| | | |
|---|---|---|
| 2015/0042574 A1 | 2/2015 | Yang et al. |
| 2017/0083143 A1* | 3/2017 | Jeong .................... G06F 3/0304 |
| 2019/0080668 A1 | 3/2019 | Holenarsipur et al. |
| 2019/0213309 A1* | 7/2019 | Morestin ................. G01S 17/04 |
| 2019/0221193 A1* | 7/2019 | Knepper .................. G09G 5/37 |
| 2020/0088645 A1* | 3/2020 | Zhang .................... G01N 21/01 |
| 2020/0217954 A1* | 7/2020 | Hall ....................... G05D 1/247 |

FOREIGN PATENT DOCUMENTS

| | | |
|---|---|---|
| CN | 106357922 A | 1/2017 |
| CN | 108983250 A | 12/2018 |
| CN | 109471491 A | 3/2019 |
| CN | 110750772 A | 2/2020 |
| KR | 20130043486 A | 4/2013 |

\* cited by examiner

ELECTRONIC DEVICE AND SENSOR CONTROL METHOD FOR CONTROLLING LIGHT SENSOR BASED ON STATUS OF TIME OF FLIGHT SENSOR

CROSS-REFERENCE TO RELATED APPLICATIONS

This is a U.S. National Stage of International Patent Application No. PCT/CN2020/113098 filed on Sep. 2, 2020, which claims priority to Chinese Patent Application No. 201910866729.X filed on Sep. 12, 2019. Both of the afore-mentioned applications are hereby incorporated by reference in their entireties.

TECHNICAL FIELD

This application relates to the field of electronic devices, and in particular, to an electronic device and a sensor control method.

BACKGROUND

A three-dimensional (3D) imaging technology is a tech-nology in which 3D information of an object is extracted by using an optical means, and a 3D feature of the object is restored as much as possible in a reconstruction process. In the 3D imaging technology, a key is to precisely obtain depth information. A time of flight (TOF) sensor can obtain the depth information with high efficiency and high quality, and therefore is most widely applied to the 3D imaging technology. A working principle of the ToF sensor is as follows: An infrared light pulse (for example, a light pulse with a wavelength of 940 nm) is continuously sent to an object, then the infrared light pulse reflected from the object is received, and a distance from the object is calculated by detecting a round trip time of flight of the infrared light pulse, to generate the depth information.

In recent years, the 3D imaging technology, especially the ToF sensor, is widely applied to an electronic device such as a mobile phone. For example, the mobile phone may per-form 3D imaging by using the ToF sensor, to implement a 3D face unlocking function. For another example, in a camera (camera) of the mobile phone, the ToF sensor is used to assist in focusing, and to determine a depth of field during photographing, to implement bokeh.

However, in addition to the ToF sensor, a light sensor such as an ambient light sensor (ambient light sensor, ALS) or a proximity sensor (proximity sensor, PS) may further be disposed in a current electronic device. The electronic device may implement, by using light intensity measured by the light sensor, a function such as automatically adjusting screen brightness or automatically turning off a screen. However, when the ToF sensor is turned on, an infrared light pulse emitted by the ToF sensor hits both the ToF sensor and the light sensor of the electronic device after being reflected by an object, and consequently accuracy of data measured by the light sensor is affected.

SUMMARY

Embodiments of this application provide an electronic device and a sensor control method, to resolve a problem that accuracy of data measured by a light sensor of an electronic device is affected because an infrared light pulse emitted when a ToF sensor is turned on hits the light sensor after being reflected by an object.

The following technical solutions are used in this appli-cation.

According to a first aspect, an embodiment of this appli-cation provides an electronic device. The electronic device includes a processor and a ToF sensor, an ambient light sensor, and a proximity sensor that are coupled to the processor. The ToF sensor, the ambient light sensor, and the proximity sensor are located on a same side of the electronic device. The processor is configured to control, when the ToF sensor is turned on, the ambient light sensor and the prox-imity sensor to be turned off. The processor is configured to control, when the ToF sensor is turned off, the ambient light sensor and the proximity sensor to be turned on.

In the technical solution, when the ToF sensor is turned on, a light sensor (for example, the ambient light sensor and the proximity sensor) may be controlled to be turned off, and when the ToF sensor is turned off, the light sensor may be controlled to be turned on, to avoid a case in which an infrared light pulse emitted when the ToF sensor is turned on affects accuracy of data measured by the light sensor. Therefore, a case in which a corresponding function of a mobile phone is unintentionally triggered is avoided, and user experience can further be improved.

In a possible implementation, the processor is coupled to the ToF sensor by using a GPIO pin, and the processor is coupled to the ambient light sensor by using a first interface, and is coupled to the proximity sensor by using a second interface. The first interface and the second interface may be I2C interfaces. The processor is further configured to output a first level (for example, a high level) to the ToF sensor by using the GPIO pin, to control the ToF sensor to be turned on. That the processor is configured to control, when the ToF sensor is turned on, the ambient light sensor and the prox-imity sensor to be turned off includes: The processor is configured to: when outputting the first level to the ToF sensor by using the GPIO pin, control, by using the first interface, the ambient light sensor to be turned off, and control, by using the second interface, the proximity sensor to be turned off.

In another possible implementation, the processor is fur-ther configured to output a second level (for example, a low level) to the ToF sensor by using the GPIO pin, to control the ToF sensor to be turned off; and that the processor is configured to control, when the ToF sensor is turned off the ambient light sensor and the proximity sensor to be turned on includes: The processor is configured to: when outputting the second level to the ToF sensor by using the GPIO pin, control, by using the first interface, the ambient light sensor to be turned on, and control, by using the second interface, the proximity sensor to be turned on. In this way, a working status (for example, on or off) of the ToF sensor is obtained by using a hardware solution, so that when the ToF sensor is turned on, the light sensor may be controlled to be turned off, and when the ToF sensor is turned off, the light sensor may be controlled to be turned on.

In another possible implementation, that the processor is configured to control, when the ToF sensor is turned on, the ambient light sensor and the proximity sensor to be turned off includes: The processor is configured to control, when the ToF sensor is enabled, the ambient light sensor and the proximity sensor to be turned off; and that the processor is configured to control, when the ToF sensor is turned off, the ambient light sensor and the proximity sensor to be turned on includes: The processor is configured to control, when the ToF sensor is not enabled, the ambient light sensor and the proximity sensor to be turned on. In this way, the electronic device may control, based on an enabling status (the enabling status may be enabled or not enabled) of the ToF sensor, the light sensor to be turned off or turned on. When the ToF sensor is enabled, the ToF sensor emits an infrared light pulse, so that when the ToF sensor emits the infrared light pulse to the outside, the light sensor may be controlled to be turned off.

In another possible implementation, the processor is further configured to: when it is determined that an application needs the ToF sensor to assist in implementing a function, generate a first command, and control, based on the first command by using a first driver, the ToF sensor to be enabled, where the first driver is a driver of the ToF sensor, and the first driver may be referred to as a ToF sensor driver; and that the processor is configured to control, when the ToF sensor is enabled, the ambient light sensor and the proximity sensor to be turned off includes: The processor is configured to control, based on the first command by using a second driver, the ambient light sensor to be turned off, and control, based on the first command by using a third driver, the proximity sensor to be turned off, where the second driver is a driver of the ambient light sensor, and the third driver is a driver of the proximity sensor. For example, when a 3D face unlocking application needs the ToF sensor to assist in generating a 3D face image, the processor may generate the first command. For another example, when a camera application needs the ToF sensor to determine a depth of field to implement bokeh, the processor may generate the first command.

In another possible implementation, the processor is further configured to: when it is determined that the application (for example, the 3D face unlocking application or the camera application) exits, generate a second command, and control, based on the second command by using the first driver, the ToF sensor to be disabled; and that the processor is configured to control, when the ToF sensor is not enabled, the ambient light sensor and the proximity sensor to be turned on includes: The processor is configured to: after the ToF sensor is disabled, control, based on the second command by using the second driver, the ambient light sensor to be turned on, and control, based on the second command by using the third driver, the proximity sensor to be turned on. In this way, the enabling status (for example, enabled or not enabled) of the ToF sensor may be obtained by using a software solution, so that when the ToF sensor is enabled, in other words, emits the infrared light pulse to the outside, the light sensor may be controlled to be turned ofI; and when the ToF sensor is not enabled, the light sensor may be controlled to be turned on.

According to a second aspect, an embodiment of this application provides an electronic device. The electronic device may include a processor and a ToF sensor, an ambient light sensor, and a proximity sensor that are coupled to the processor. The ToF sensor, the ambient light sensor, and the proximity sensor are located on a same side of the electronic device. The processor discards, when the ToF sensor is turned on, data measured by the ambient light sensor and the proximity sensor; and implements, when the ToF sensor is turned of; a first function of the electronic device based on data measured by the ambient light sensor, and implements, when the ToF sensor is turned off, a second function of the electronic device based on data measured by the proximity sensor. For example, the first function may be automatically adjusting screen brightness, and the second function may be determining whether there is an object near a mobile phone.

In the technical solution, when the ToF sensor is turned on, data measured by a light sensor is discarded, and when the ToF sensor is turned off, data measured by the light sensor is used. In this way, a case in which a corresponding function of the mobile phone is unintentionally triggered can be avoided, and user experience can further be improved.

In a possible implementation, the processor determines a percentage of an infrared component in ambient light based on data output by the ambient light sensor; that the processor discards, when the ToF sensor is turned on, data measured by the ambient light sensor and the proximity sensor includes: The processor discards, when determining that the percentage of the infrared component in the ambient light is greater than a threshold, the data measured by the ambient light sensor and the proximity sensor; and that the processor implements, when the ToF sensor is turned off a first function of the electronic device based on data measured by the ambient light sensor, and implements, when the ToF sensor is turned off, a second function of the electronic device based on data measured by the proximity sensor includes: The processor implements, when determining that the percentage of the infrared component in the ambient light is less than the threshold, the first function based on the data measured by the ambient light sensor, and implements, when determining that the percentage of the infrared component in the ambient light is less than the threshold, the second function based on the data measured by the proximity sensor. In this way, the percentage of the infrared component in the ambient light is monitored, to determine whether to turn on or turn off the ToF sensor.

In another possible implementation, that the processor determines a percentage of an infrared component in ambient light based on data output by the ambient light sensor includes: The processor determines light intensity of infrared in the ambient light based on light intensity of a red R channel, light intensity of a green G channel, light intensity of a blue B channel, and light intensity of a custom C channel in the ambient light that are output by the ambient light sensor, and determines the percentage of the infrared component in the ambient light based on the light intensity of the infrared and the light intensity of the C channel. For example, the light intensity of the infrared in the ambient light may be determined by using the following formula (1) or (2). The formula (1) is $IR=(R+G+B-C)/2$, and the formula (2) is $IR=C-(R+G+B)$, where IR represents the light intensity of the IR in the ambient light, R represents the light intensity of the R channel in the ambient light, G represents the light intensity of the G channel in the ambient light, B represents the light intensity of the B channel in the ambient light, and C represents the light intensity of the C channel in the ambient light.

According to a third aspect, an embodiment of this application provides a sensor control method. The sensor control method may be applied to an electronic device. The electronic device may include a ToF sensor, an ambient light sensor, and a proximity sensor. The ToF sensor, the ambient light sensor, and the proximity sensor are located on a same side of the electronic device. The method may include: The electronic device controls, when the ToF sensor is turned on, the ambient light sensor and the proximity sensor to be turned off; and the electronic device controls, when the ToF sensor is turned off, the ambient light sensor and the proximity sensor to be turned on.

In a possible implementation, the method may further include: The electronic device outputs a first level to the ToF sensor, to control the ToF sensor to be turned on; and that the electronic device controls, when the ToF sensor is turned on, the ambient light sensor and the proximity sensor to be turned off includes: The electronic device controls, when outputting the first level to the ToF sensor, the ambient light sensor and the proximity sensor to be turned off.

In another possible implementation, the method may further include: The electronic device outputs a second level to the ToF sensor, to control the ToF sensor to be turned off; and that the electronic device controls, when the ToF sensor is turned off, the ambient light sensor and the proximity sensor to be turned on includes: The electronic device controls, when outputting the second level to the ToF sensor, the ambient light sensor and the proximity sensor to be turned on.

In another possible implementation, that the electronic device controls, when the ToF sensor is turned on, the ambient light sensor and the proximity sensor to be turned off includes: The electronic device controls, when the ToF sensor is enabled, the ambient light sensor and the proximity sensor to be turned off; and that the electronic device controls, when the ToF sensor is turned off, the ambient light sensor and the proximity sensor to be turned on includes: The electronic device controls, when the ToF sensor is not enabled, the ambient light sensor and the proximity sensor to be turned on.

In another possible implementation, the method may further include: When determining that an application needs the ToF sensor to assist in implementing a function, the electronic device generates a first command, and controls, based on the first command by using a first driver, the ToF sensor to be enabled, where the first driver is a driver of the ToF sensor; and that the electronic device controls, when the ToF sensor is enabled, the ambient light sensor and the proximity sensor to be turned off includes: The electronic device controls, based on the first command by using a second driver, the ambient light sensor to be turned off, and controls, based on the first command by using a third driver, the proximity sensor to be turned off, where the second driver is a driver of the ambient light sensor, and the third driver is a driver of the proximity sensor.

In another possible implementation, the method may further include: When determining that the application exits, the electronic device generates a second command, and controls, based on the second command by using the first driver, the ToF sensor to be disabled; and that the electronic device controls, when the ToF sensor is not enabled, the ambient light sensor and the proximity sensor to be turned on includes: After the ToF sensor is disabled, the electronic device controls, based on the second command by using the second driver, the ambient light sensor to be turned on, and controls, based on the second command by using the third driver, the proximity sensor to be turned on.

According to a fourth aspect, an embodiment of this application provides a sensor control method. The sensor control method may be applied to an electronic device. The electronic device may include a ToF sensor, an ambient light sensor, and a proximity sensor. The ToF sensor, the ambient light sensor, and the proximity sensor are located on a same side of the electronic device. The method may include: The electronic device discards, when the ToF sensor is turned on, data measured by the ambient light sensor and the proximity sensor; and the electronic device implements, when the ToF sensor is turned off, a first function of the electronic device based on data measured by the ambient light sensor, and implements, when the ToF sensor is turned off, a second function of the electronic device based on data measured by the proximity sensor.

In a possible implementation, the method may further include: The electronic device determines a percentage of an infrared component in ambient light based on data output by the ambient light sensor; that the electronic device discards, when the ToF sensor is turned on, data measured by the ambient light sensor and the proximity sensor includes: The electronic device discards, when determining that the percentage of the infrared component in the ambient light is greater than a threshold, the data measured by the ambient light sensor and the proximity sensor; and that the electronic device implements, when the ToF sensor is turned off, a first function of the electronic device based on data measured by the ambient light sensor, and implements, when the ToF sensor is turned off, a second function of the electronic device based on data measured by the proximity sensor includes: The electronic device implements, when determining that the percentage of the infrared component in the ambient light is less than the threshold, the first function based on the data measured by the ambient light sensor; and the electronic device implements, when determining that the percentage of the infrared component in the ambient light is less than the threshold, the second function based on the data measured by the proximity sensor.

In another possible implementation, that the electronic device determines a percentage of an infrared component in ambient light based on data output by the ambient light sensor includes: The electronic device determines light intensity of infrared in the ambient light based on light intensity of an R channel, light intensity of a G channel, light intensity of a B channel, and light intensity of a C channel in the ambient light that are output by the ambient light sensor; and the electronic device determines the percentage of the infrared component in the ambient light based on the light intensity of the infrared and the light intensity of the C channel.

According to a fifth aspect, an embodiment of this application provides an electronic device. The electronic device may include a processor, a memory, a ToF sensor, an ambient light sensor, and a proximity sensor. The ToF sensor, the ambient light sensor, and the proximity sensor are located on a same side of the electronic device. The processor, the ToF sensor, the ambient light sensor, the proximity sensor, and a memory are coupled. The memory is configured to store computer program code, and the computer program code includes computer instructions. When the computer instructions are executed by the electronic device, the electronic device is enabled to perform the sensor control method according to any one of the third aspect, the possible implementations of the third aspect, the fourth aspect, or the possible implementations of the fourth aspect.

According to a sixth aspect, an embodiment of this application provides a computer-readable storage medium, including computer software instructions. When the computer software instructions are run on an electronic device, the electronic device is enabled to perform the sensor control method according to any one of the third aspect, the possible implementations of the third aspect, the fourth aspect, or the possible implementations of the fourth aspect.

According to a seventh aspect, an embodiment of this application provides a computer program product. When the computer program product is run on a computer, the computer is enabled to perform the sensor control method according to any one of the third aspect, the possible implementations of the third aspect, the fourth aspect, or the possible implementations of the fourth aspect.

It may be understood that the method according to the third aspect and the fourth aspect, the electronic device according to the fifth aspect, the computer-readable storage medium according to the sixth aspect, and the computer program product according to the seventh aspect correspond to the electronic device according to the first aspect and the second aspect. Therefore, for beneficial effects that can be achieved by the method, the electronic device, the computer-readable storage medium, and the computer program product, refer to the beneficial effects of the corresponding electronic device provided above. Details are not described herein.

DESCRIPTION OF EMBODIMENTS

Functions of an electronic device such as a mobile phone may be enriched by configuring various sensors for the electronic device, to provide better user experience. For example, a ToF sensor may be configured in the mobile phone, and is used to implement a 3D face unlocking function, and to determine a depth of field during implementation of a photographing function, to implement bokeh. For another example, a light sensor such as a proximity sensor or an ambient light sensor may be configured in the mobile phone. The proximity sensor may be used by the mobile phone to determine whether there is an object near the mobile phone, to implement a function of automatically turning off a screen. The ambient light sensor may be used by the mobile phone to automatically adjust screen brightness.

Figure 1:
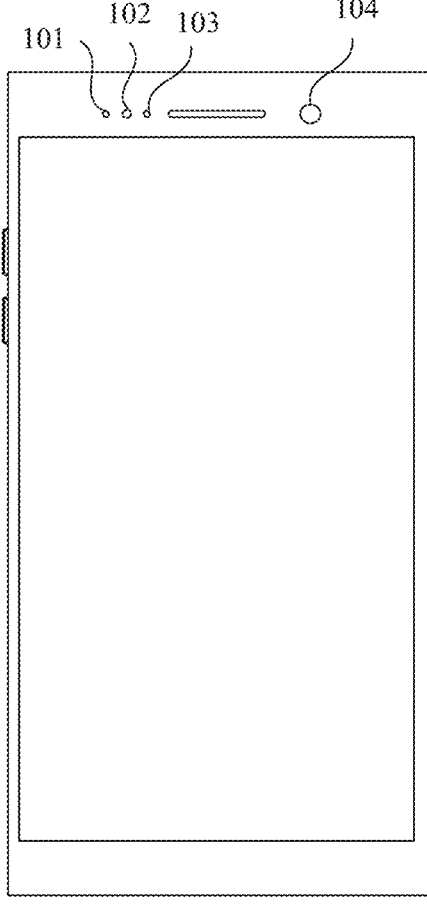
FIG. 1 is a schematic diagram of a front of a mobile phone according to an embodiment of this application.

Both the ToF sensor and the light sensor may be configured in the electronic device. In addition, the ToF sensor and the light sensor may be disposed on a same side of the electronic device. For example, the electronic device is a mobile phone, and the ToF sensor, the proximity sensor, and the ambient light sensor are all disposed in the mobile phone. FIG. 1 is a schematic diagram of a front of a mobile phone according to an embodiment of this application. A ToF sensor 101, a proximity sensor 102, and an ambient light sensor 103 are all disposed on the front of the mobile phone. It should be noted that FIG. 1 merely shows examples of positions of components in the mobile phone. The positions of the components in the mobile phone are not limited thereto.

Figure 2:
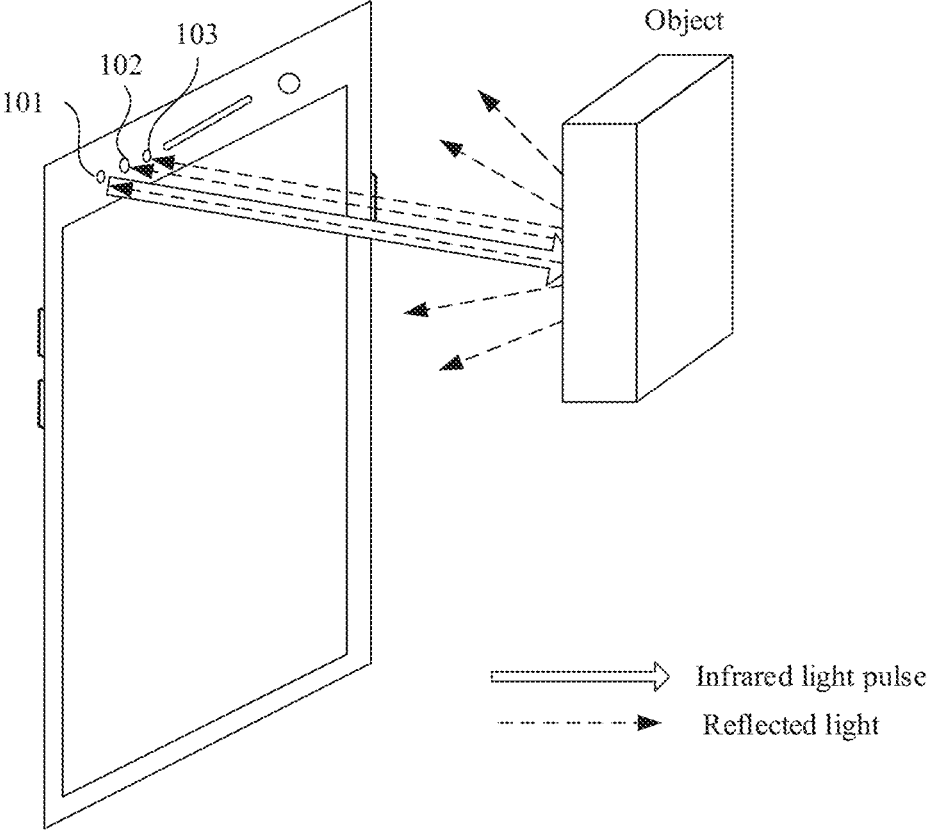
FIG. 2 is a schematic diagram of a scenario in which a ToF sensor interferes with an ambient light sensor and a proximity sensor according to an embodiment of this application.

It may be understood that with reference to FIG. 1, as shown in FIG. 2, when the ToF sensor 101 is turned on, an infrared light pulse is emitted, and the infrared light pulse is reflected (for example, diffusely reflected) after encountering an object. Reflected light is received by the ToF sensor 101. The ToF sensor 101 may obtain a round trip time of flight of the infrared light pulse through detection. The mobile phone may calculate a distance from the object based on the round trip time of flight that is obtained by the ToF sensor 101, to generate depth information, so as to assist the mobile phone in implementing a corresponding function. Continuing to refer to FIG. 2, the proximity sensor 102, the ambient light sensor 103, and the ToF sensor 101 are disposed on a same side of the mobile phone. Therefore, when the proximity sensor 102 and the ambient light sensor 103 are turned on, the reflected light may also be received by the proximity sensor 102 and the ambient light sensor 103. In this case, accuracy of data measured by the proximity sensor 102 and the ambient light sensor 103 may be affected, and consequently a corresponding function of the mobile phone is unintentionally triggered.

For example, FIG. 3(a), FIG. 3(b), FIG. 3(c), and FIG. 3(d) are a schematic diagram of light intensity measured by the proximity sensor 102 when the ToF sensor 101 is turned off and the mobile phone is at different distances from the object. FIG. 3(a), FIG. 3(b), FIG. 3(c), and FIG. 3(d) are respectively schematic diagrams of light intensity measured by the proximity sensor 102 when the ToF sensor 101 is turned off and the mobile phone is 3 centimeters (cm), 7 cm, 10 cm, and 15 cm away from the object.

FIG. 4(a), FIG. 4(b), FIG. 4(c), and FIG. 4(d) are a schematic diagram of light intensity measured by the proximity sensor 102 when the ToF sensor 101 is turned on and the mobile phone is at different distances from the object. FIG. 4(a), FIG. 4(b), FIG. 4(c), and FIG. 4(d) are respectively schematic diagrams of light intensity measured by the proximity sensor 102 when the ToF sensor 101 is turned on and the mobile phone is 3 cm, 7 cm, 10 cm, and 15 cm away from the object.

In FIG. 3(a), FIG. 3(b), FIG. 3(c), FIG. 3(d), FIG. 4(a), FIG. 4(b), FIG. 4(c), and FIG. 4(d), a horizontal coordinate is a data point number, and a vertical coordinate is the light intensity measured by the proximity sensor 102.

Figures 3A, 3B, 3C, 3D:
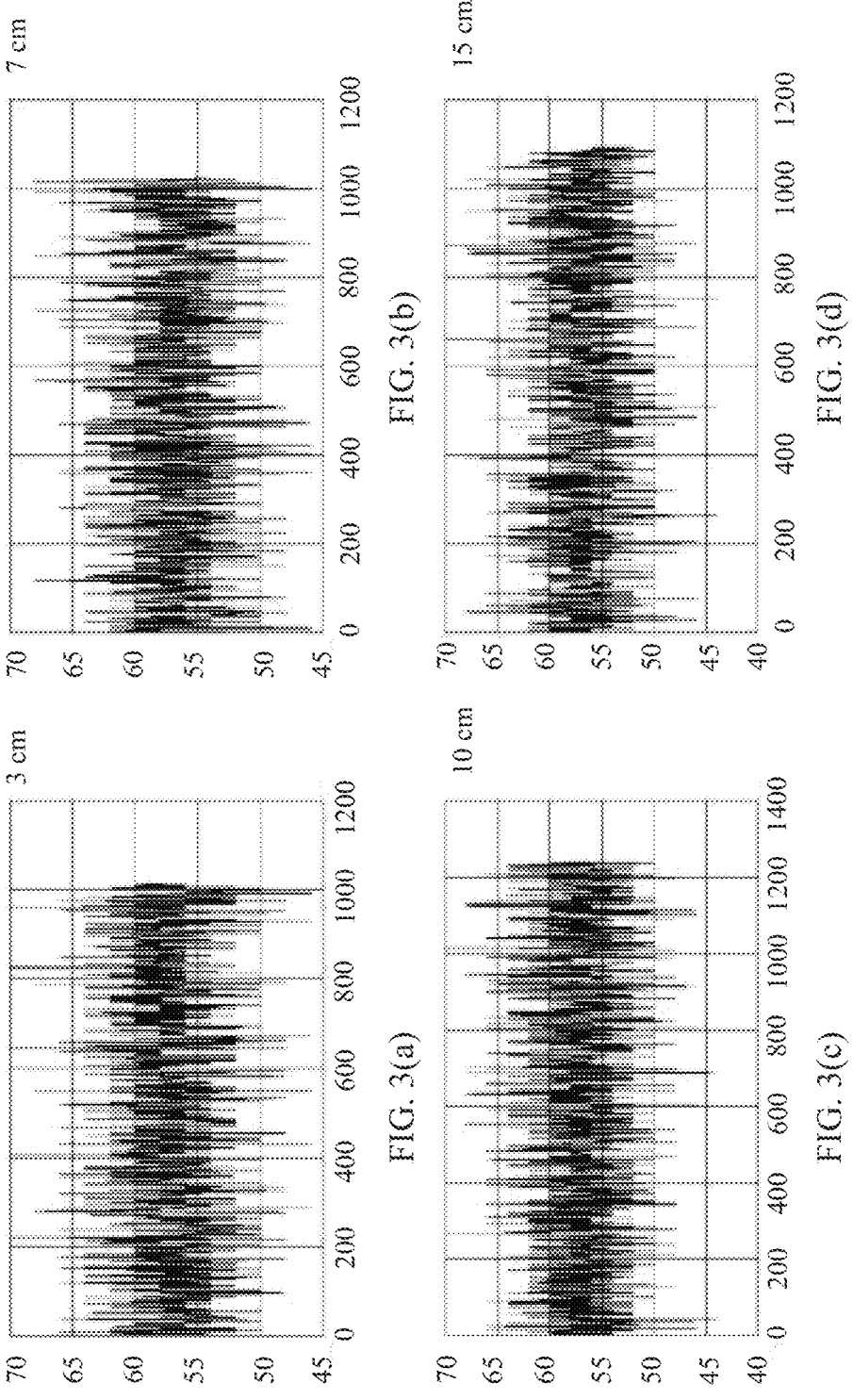
FIG. 3(a), FIG. 3(b), FIG. 3(c), and FIG. 3(d) are a schematic diagram of a measurement result of a proximity sensor that is obtained when a ToF sensor is turned off according to an embodiment of this application.
Figures 4A, 4B, 4C, 4D:
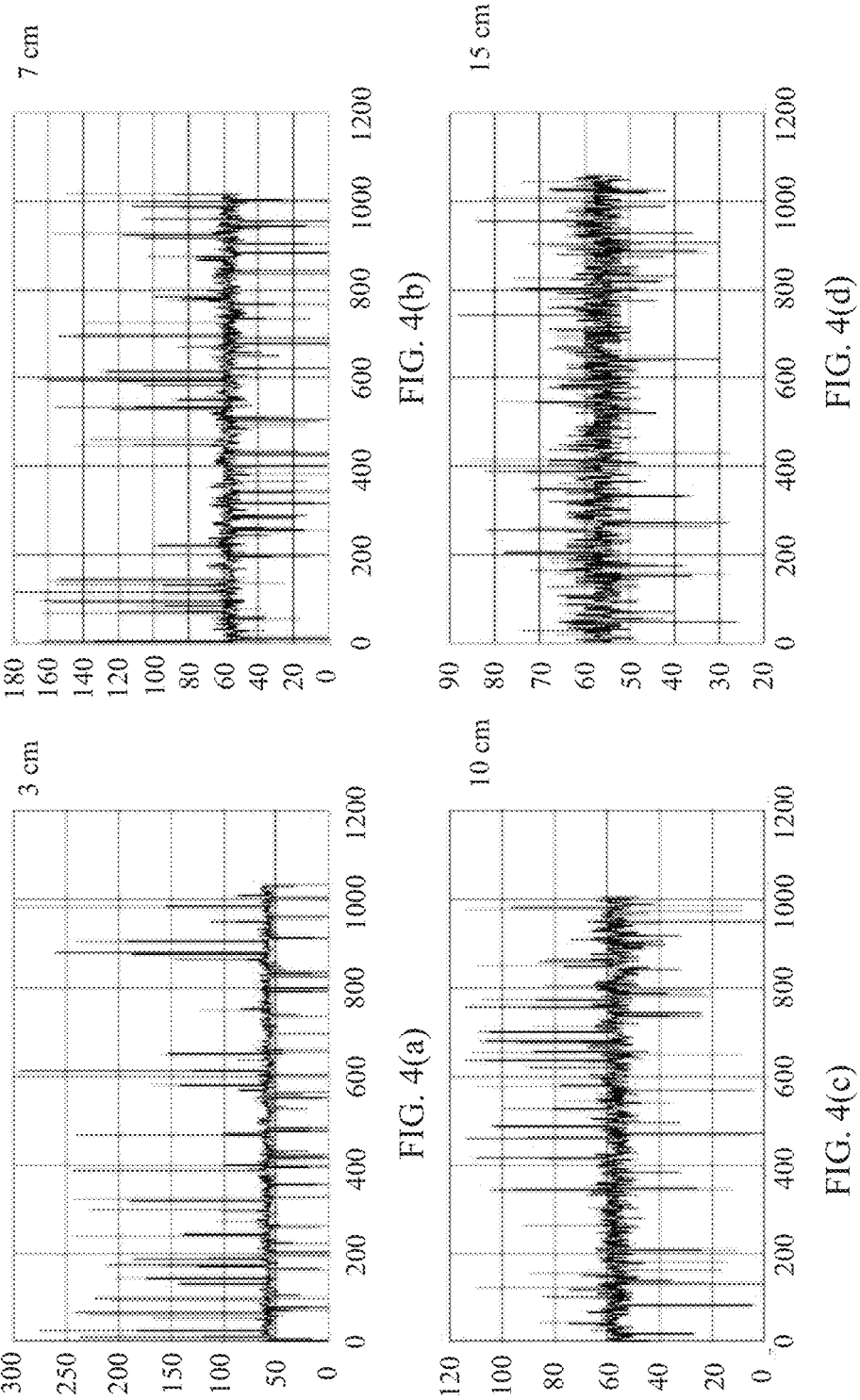
FIG. 4(a), FIG. 4(b), FIG. 4(c), and FIG. 4(d) are a schematic diagram of a measurement result of a proximity sensor that is obtained when a ToF sensor is turned on according to an embodiment of this application.
Figures 5A, 5B, 5C, 5D:
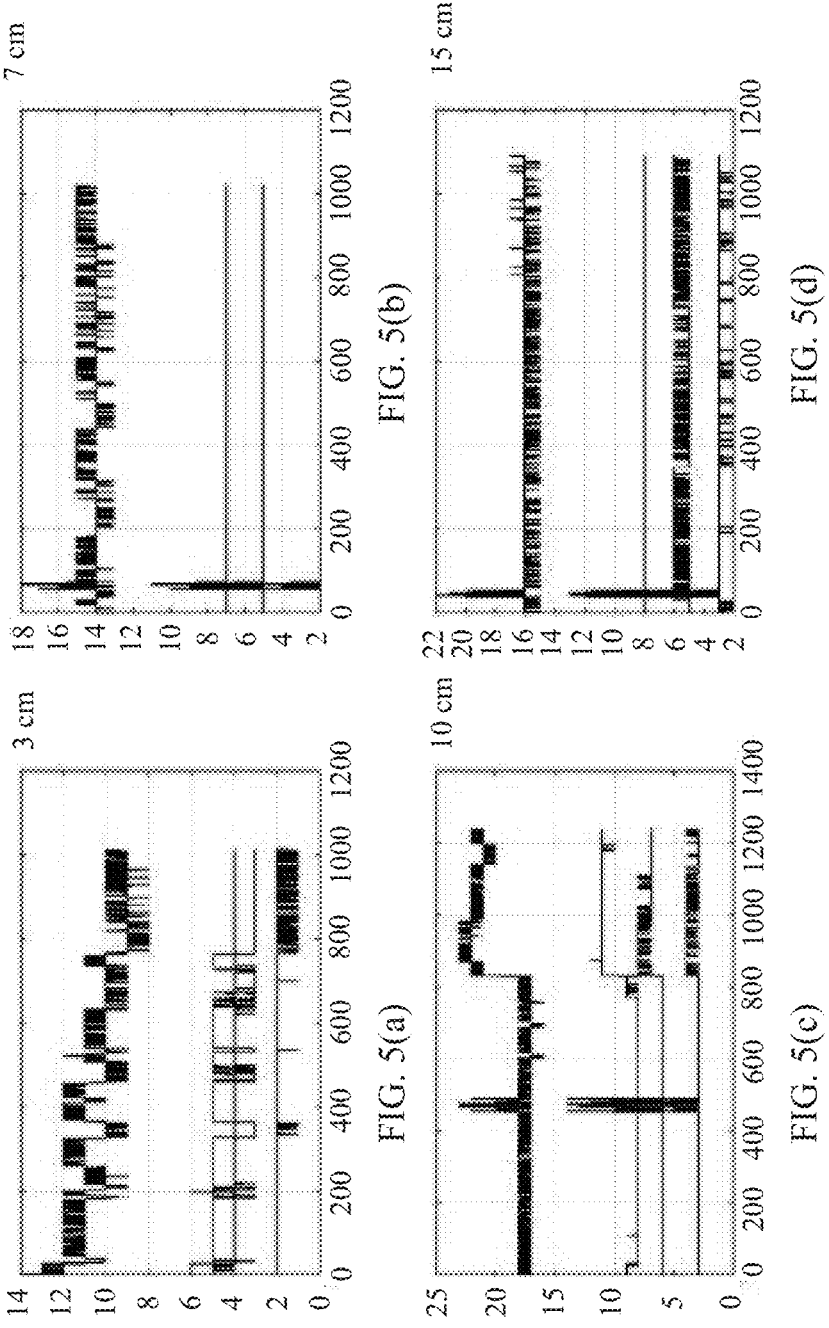
FIG. 5(a), FIG. 5(b), FIG. 5(c), and FIG. 5(d) are a schematic diagram of a measurement result of an ambient light sensor that is obtained when a ToF sensor is turned off according to an embodiment of this application.
Figures 6A, 6B, 6C, 6D:
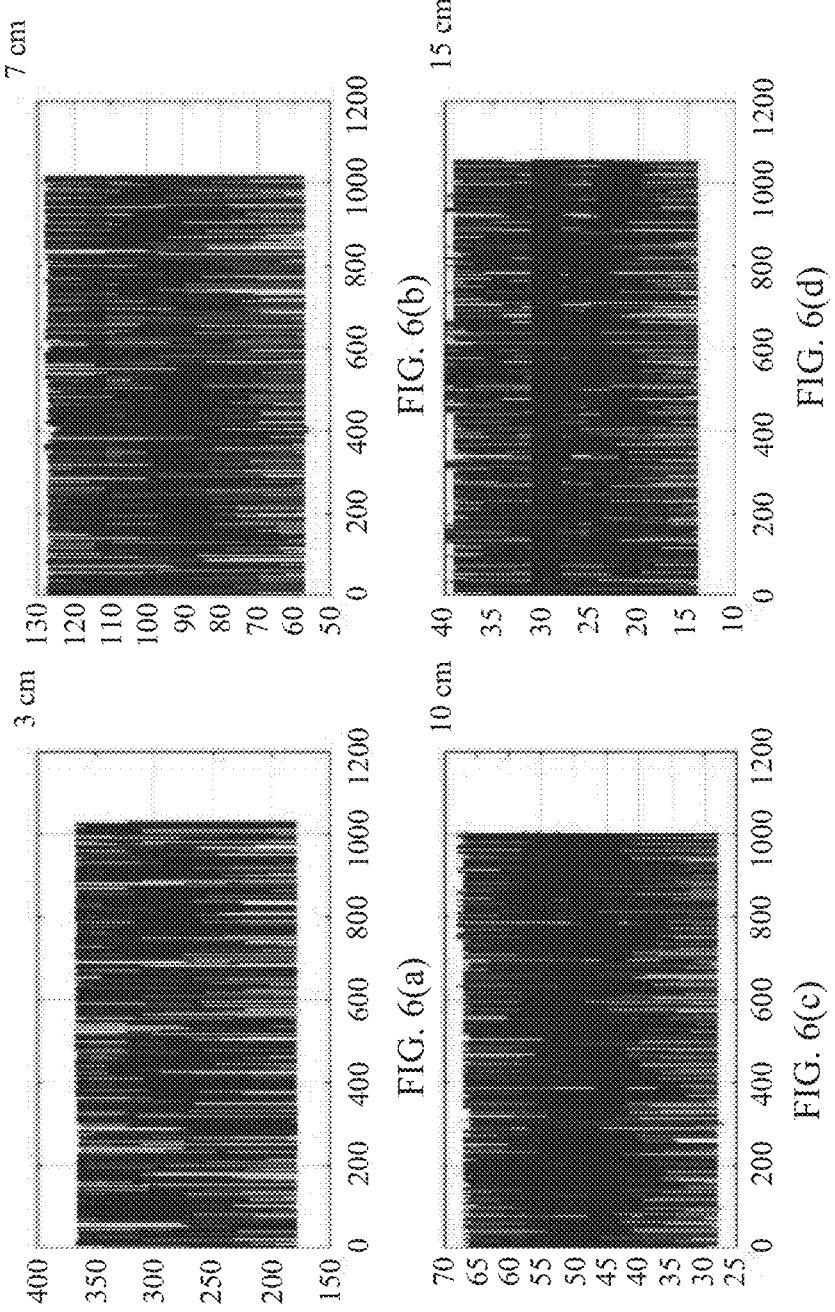
FIG. 6(a), FIG. 6(b), FIG. 6(c), and FIG. 6(d) are a schematic diagram of a measurement result of an ambient light sensor that is obtained when a ToF sensor is turned on according to an embodiment of this application.

It may be learned from FIG. 3(a), FIG. 3(b). FIG. 3(c), FIG. 3(d), FIG. 4(a), FIG. 4(b), FIG. 4(c), and FIG. 4(d) that when the ToF sensor 101 is turned off, the light intensity measured by the proximity sensor 102 when the mobile phone is 3 cm, 7 cm, 10 cm, and 15 cm away from the object basically ranges from 40 to 70. When the ToF sensor 101 is turned on and the mobile phone is 3 cm, 7 cm, 10 cm, and 15 cm away from the object, due to reflection impact of the infrared light pulse emitted by the ToF sensor 101, the light intensity measured by the proximity sensor 102 is increased when compared with the light intensity measured by the proximity sensor 102 when the ToF sensor 101 is turned off. A shorter distance between the mobile phone and the object indicates a larger quantity of times by which the light intensity is increased. For example, when the distance between the mobile phone and the object is 3 cm, the light intensity is increased by at least four times, and when the distance between the mobile phone and the object is 7 cm, the light intensity is increased by at least two times. In other words, when the ToF sensor 101 is turned on, data measured by the proximity sensor 102 is not accurate, and consequently a corresponding function of the mobile phone is unintentionally triggered.

For example, as shown in FIG. 1, a camera 104 is disposed on the front of the mobile phone. When a user takes a photo by using the camera 104, the ToF sensor 101 is turned on, and is used to determine a depth of field, to implement bokeh. In addition, when the user takes a photo, the mobile phone is in a screen-on state. In the screen-on state, the proximity sensor 102 is also turned on, and is used by the mobile phone to determine whether there is an object near the mobile phone, to implement a function of automatically turning off a screen. In this scenario, the proximity sensor 102 can receive the reflected light of the infrared light pulse emitted by the ToF sensor 101, and therefore relatively high light intensity is measured. In this way, when the object is relatively far away from the mobile phone, the mobile phone may mistakenly determine that there is an object near the mobile phone, and then automatically turn off the screen. In other words, the mobile phone may automatically turn off the screen when the user is taking a photo.

For another example, FIG. 5(a), FIG. 5(b), FIG. 5(c), and FIG. 5(d) are a schematic diagram of light intensity measured by the ambient light sensor 103 when the ToF sensor 101 is turned off and the mobile phone is at different distances from the object. FIG. 5(a), FIG. 5(b), FIG. 5(c), and FIG. 5(d) are respectively schematic diagrams of light intensity measured by the ambient light sensor 103 when the ToF sensor 101 is turned off and the mobile phone is 3 cm, 7 cm, 10 cm, and 15 cm away from the object.

FIG. 6(a), FIG. 6(b), FIG. 6(c), and FIG. 6(d) are a schematic diagram of light intensity measured by the ambient light sensor 103 when the ToF sensor 101 is turned on and the mobile phone is at different distances from the object. FIG. 6(a), FIG. 6(b), FIG. 6(c), and FIG. 6(d) are respectively schematic diagrams of light intensity measured by the ambient light sensor 103 when the ToF sensor 101 is turned on and the mobile phone is 3 cm, 7 cm, 10 cm, and 15 cm away from the object.

In FIG. 5(a), FIG. 5(b), FIG. 5(c), FIG. 5(d), FIG. 6(a), FIG. 6(b), FIG. 6(c), and FIG. 6(d), a horizontal coordinate is a data point number, and a vertical coordinate is light intensity that is of four channels in ambient light and that is measured by the ambient light sensor 103. The four channels may be respectively an R channel, a G channel, a B channel, and a C channel. The R channel is a red (red) channel, the G channel is a green (green) channel, the B channel is a blue (blue) channel, and the C channel is a custom (custom) color channel.

It may be learned from FIG. 5(a), FIG. 5(b), FIG. 5(c), FIG. 5(d), FIG. 6(a), FIG. 6(b), FIG. 6(c), and FIG. 6(d) that when the ToF sensor 101 is turned off, the light intensity that is of the four channels in the ambient light and that is measured by the ambient light sensor 103 when the mobile phone is 3 cm, 7 cm, 10 cm, and 15 cm away from the object basically ranges from 0 to 25. When the ToF sensor 101 is turned on and the mobile phone is 3 cm, 7 cm, 10 cm, and 15 cm away from the object, due to reflection impact of the infrared light pulse emitted by the ToF sensor 101, the light intensity that is of the four channels in the ambient light and that is measured by the ambient light sensor 103 is increased when compared with the light intensity that is of the four channels in the ambient light and that is measured by the ambient light sensor 103 when the ToF sensor 101 is turned off. A shorter distance between the mobile phone and the object indicates a larger quantity of times by which the light intensity is increased. In other words, when the ToF sensor 101 is turned on, data measured by the ambient light sensor 103 is not accurate, and consequently a corresponding function of the mobile phone is unintentionally triggered.

For example, when the user performs 3D face unlocking, the ToF sensor 101 is turned on, and is used to obtain a 3D face image of the user. In addition, when 3D face unlocking is performed, the mobile phone is in a screen-on state that exists when the mobile phone is locked. In the screen-on state that exists when the mobile phone is locked, the ambient light sensor 103 is also turned on, and is used by the mobile phone to automatically adjust screen brightness. In this scenario, the ambient light sensor 103 receives the reflected light of the infrared light pulse emitted by the ToF sensor 101, and therefore relatively high light intensity is measured. In this way, the mobile phone may increase the screen brightness of the mobile phone in a dark environment, resulting in eye irritation.

In conclusion, it may be learned that if the light sensor (for example, the ambient light sensor or the proximity sensor) is also turned on when the ToF sensor is turned on, an infrared light pulse emitted by the ToF sensor affects accuracy of data measured by the light sensor, and consequently a corresponding function of the electronic device is unintentionally triggered. According to a method provided in the embodiments of this application, impact imposed on the light sensor when the ToF sensor is turned on can be corrected, to avoid a case in which the corresponding function of the electronic device is unintentionally triggered. Therefore, user experience is improved.

The following describes implementations of the embodiments of this application in detail with reference to the accompanying drawings.

For example, the electronic device in the embodiments of this application may be a device that includes a ToF sensor and a light sensor, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), a wearable electronic device (for example, a smart watch), or an augmented reality (augmented reality, AR)/virtual reality (virtual reality, VR) device. A specific form of the device is not specifically limited in the embodiments of this application. The light sensor may include a proximity sensor and/or an ambient light sensor.

Figure 7:
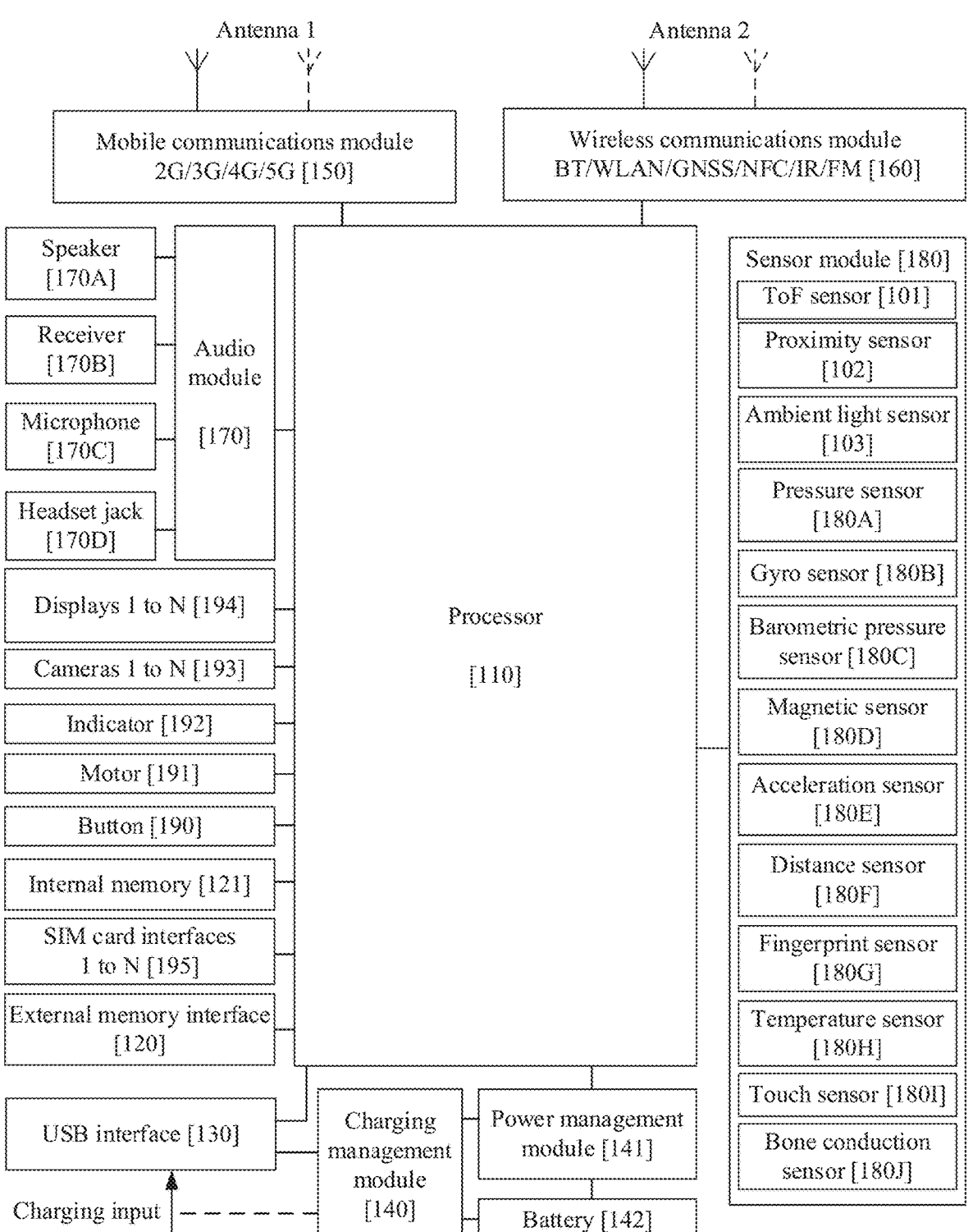
FIG. 7 is a schematic diagram of a structure of an electronic device according to an embodiment of this application.

FIG. 7 is a schematic diagram of a structure of an electronic device according to an embodiment of this application. As shown in FIG. 7, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module. SIM) card interface 195, and the like.

The sensor module 180 may include a ToF sensor 101, a proximity sensor 102, an ambient light sensor 103, a pressure sensor 180A, a gyro sensor 180B, a barometric pressure sensor 180C, a magnetic sensor 180D, an acceleration sensor 180E, a distance sensor 180F, a fingerprint sensor 180G, a temperature sensor 180H, a touch sensor 180I, a bone conduction sensor 180J, and the like.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device. The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, an SIM interface, a USB interface, and/or the like.

The I2C interface is a bidirectional synchronous serial bus, and includes a serial data line (serial data line, SDA) and a serial clock line (serial clock line, SCL). In some embodiments, the processor 110 may include a plurality of groups of I2C interfaces. The processor 110 may be separately coupled to the ToF sensor 101, the proximity sensor 102, the ambient light sensor 103, the touch sensor 180I, the charger, a flash, the camera 193, and the like by using different I2C interfaces. For example, the processor 110 may be coupled to the ToF sensor 101 by using the I2C interface, so that the processor 110 communicates with the ToF sensor 101 by using the I2C interface, to implement a 3D face unlocking function of the electronic device, or to determine a depth of field during implementation of a photographing function, to implement a bokeh function. The processor 110 may further be coupled to the proximity sensor 102 by using the I2C interface, so that the processor 110 communicates with the proximity sensor 102 by using the I2C interface, to implement a function of automatically turning off a screen of the electronic device. The processor 110 may further be coupled to the ambient light sensor 103 by using the I2C interface, so that the processor 110 communicates with the ambient light sensor 103 by using the I2C interface, to implement a function of automatically adjusting screen brightness of the electronic device. The processor 110 may further be coupled to the touch sensor 180I by using the I2C interface, so that the processor 110 communicates with the touch sensor 180I by using the I2C interface, to implement a touch function of the electronic device.

The MIPI interface may be configured to connect the processor 110 to peripheral components such as the display 194 and the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

It may be understood that an interface connection relationship between the modules shown in this embodiment is merely an example for description, and does not constitute a limitation on the structure of the electronic device. In some other embodiments, the electronic device 10 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution that is for wireless communication including 2G/3G/4G/5G and the like and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules in the processor 110.

The wireless communications module 160 may provide wireless communication solutions applied to the electronic device, including a wireless local area network (wireless local area network, WLAN) (such as a wireless fidelity (wireless fidelity, Wi-Fi) network). Bluetooth (Bluetooth, BT), a global navigation satellite system (global navigation satellite system. GNSS), frequency modulation (frequency modulation, FM), near field communication (near field communication. NFC), an infrared (infrared, IR) technology, and the like. The wireless communications module 160 may be one or more devices that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device is coupled to the mobile communications module 150, and the antenna 2 is coupled to the wireless communications module 160, so that the electronic device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system. SBAS).

The electronic device implements the display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device may include one or N displays 194, where N is a positive integer greater than 1.

The electronic device may implement the photographing function by using the ToF sensor 101, the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1. For example, the electronic device may include the camera 104

(which may be referred to as a front-facing camera) shown in FIG. 1, and may further include one or more cameras (which may be referred to as rear-facing cameras) disposed on a back of the electronic device (for example, a mobile phone).

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. In this way, the electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. An application such as intelligent cognition, for example, image recognition, facial recognition, speech recognition, or text understanding of the electronic device may be implemented by using the NPU.

The external memory interface 120 may be configured to connect to an external memory card, for example, a micro SD card, to extend a storage capability of the electronic device. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instruction stored in the internal memory 121, to perform various function applications of the electronic device and data processing. For example, in this embodiment of this application, when determining that the ToF sensor 101 is turned on, the processor 110 may control, by executing the instructions stored in the internal memory 121, a light sensor (the proximity sensor 102 and/or the ambient light sensor 103) to be turned off, or discard data measured by a light sensor (the proximity sensor 102 and/or the ambient light sensor 103) w % ben the ToF sensor 101 is turned on. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device is used, and the like. In addition, the internal memory 121 may include a high-speed random access memory, and may further include a nonvolatile memory, for example, at least one magnetic disk storage device, a flash memory, or a universal flash storage (universal flash storage, UFS).

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may be configured to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to receive a voice.

The microphone 170C, also referred to as a "mic" or a "mike", is configured to convert a sound signal into an electrical signal. When making a call, sending voice information, or needing to trigger, by using a voice assistant, the electronic device to perform some functions, the user may make a sound by putting the mouth close to the microphone 170C, and input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface, or a cellular telecommunications industry association of the USA (cellular telecommunications industry association of the USA, CTIA) standard interface.

The ToF sensor 101 may continuously send an infrared light pulse (for example, a light pulse with a wavelength of 940 nm) to an object, then receive the infrared light pulse reflected from the object, and may obtain a round trip time of flight of the infrared light pulse through detection. The ToF sensor 101 outputs the detected round trip time of flight of the infrared light pulse to the processor 110. The processor 110 calculates a distance between the electronic device and the object based on the round trip time of flight that is of the infrared light pulse and that is output by the ToF sensor 101. In some other embodiments, after detecting the round trip time of flight of the infrared light pulse, the ToF sensor 101 may calculate the distance between the electronic device and the object based on the detected round trip time of flight of the infrared light pulse, and then output the calculated distance between the electronic device and the object to the processor 110.

The electronic device may implement a 3D face unlocking function by using data output by the ToF sensor 101, and may further implement another function by using the data output by the ToF sensor 101. For example, when implementing the photographing function, the electronic device may determine a depth of field by using the data output by the ToF sensor 101, to implement bokeh. In a scenario such as a scenario in which unlocking is performed by using the 3D face unlocking function or the photographing function is implemented by using the front-facing camera such as the camera 104 shown in FIG. 1, the processor 110 may control the ToF sensor 101 to be turned on.

The proximity sensor 102 may include, for example, a light-emitting diode (LED) and an optical detector such as a photodiode. The light-emitting diode may be an infrared light-emitting diode. The proximity sensor 102 emits an infrared light pulse to the outside, and then detects infrared reflected light from an object. The proximity sensor 102 outputs light intensity of the detected infrared reflected light to the processor 110. The processor 110 may implement a corresponding function based on the light intensity output by the proximity sensor 102. For example, the proximity sensor 102 may be configured to measure whether there is an object close to the electronic device. For example, when the processor 110 determines that the light intensity exceeds a threshold, in other words, the proximity sensor 102 detects sufficient reflected light, it may be determined that there is an object near the electronic device. When the processor 110 determines that the light intensity does not exceed the threshold, in other words, the proximity sensor 102 detects insufficient reflected light, the electronic device may determine that there is no object near the electronic device.

The electronic device may detect, by using the proximity sensor 102, that the user holds the electronic device close to an ear for a call, and then automatically turn off the screen, to prevent a human body from unintentionally touching the screen and save power. The electronic device may further automatically turn off the screen or light up the screen in a holster mode (mode in which whether a holster mounted on the electronic device is opened is detected) or a pocket mode (mode in which whether the electronic device is placed in a pocket is detected) by using the proximity sensor 102. In a scenario such as a scenario in which a call is made by using the electronic device, the pocket mode is enabled, or the holster mode is enabled, the processor 110 may control the proximity sensor 102 to be turned on. When the scenario is exited, the processor 110 may control the proximity sensor 102 to be turned off.

The ambient light sensor 103 is configured to sense brightness of ambient light. For example, the ambient light sensor 103 may measure light intensity of four channels in the ambient light. The ambient light sensor 103 outputs the measured light intensity of the four channels in the ambient light to the processor 110. The processor 110 may process (for example, perform integration on the light intensity of the four channels in the ambient light) the light intensity that is of the four channels in the ambient light and that is output by the ambient light sensor 103, to obtain light intensity (for example, an illuminance value, or an illuminance value and a color temperature value) of the ambient light. In a screen-on state (including a screen-on state that exists after the electronic device is unlocked and a screen-on state that exists when the electronic device is locked), the electronic device may adaptively adjust brightness of the display 194 based on the obtained light intensity of the ambient light. For example, when the light intensity of the ambient light is relatively low, the screen brightness is reduced, to avoid eye irritation. When the light intensity of the ambient light is relatively high, the screen brightness is increased, to more clearly display the screen. The ambient light sensor 103 may further be configured to automatically adjust white balance during implementation of the photographing function. When the electronic device is in the screen-on state or implements the photographing function, the processor 110 controls the ambient light sensor 103 to be turned on. When the electronic device is in a screen-off state, the processor controls the ambient light sensor 103 to be turned off.

In this embodiment of this application, to prevent reflected light of the infrared light pulse emitted by the ToF sensor 101 from affecting data measured by the light sensor (the proximity sensor 102 and/or the ambient light sensor 103), when it is determined that the ToF sensor 101 is turned on, the light sensor may be controlled to be turned off, or data measured by the light sensor when the ToF sensor 101 is turned on is discarded.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed.

The gyro sensor 180B may be configured to determine a motion posture of the electronic device. In some embodiments, angular velocities of the electronic device around three axes (namely, axes x, y, and z) may be determined by using the gyro sensor 180H. The gyro sensor 180B may be configured to perform image stabilization during photographing. For example, when the shutter is pressed, the gyro sensor 180B detects an angle at which the electronic device shakes, and calculates, based on the angle, a distance for which a lens module needs to compensate, so that the lens cancels the shake of the electronic device through reverse motion, to implement image stabilization. The gyro sensor 180B may further be used in a navigation scenario and a motion-sensing game scenario.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall effect sensor. The electronic device may detect opening and closing of a flip holster by using the magnetic sensor 180D. In some embodiments, when the electronic device is a flip phone, the electronic device may detect opening and closing of a flip cover by using the magnetic sensor 180D. Further, a feature such as automatic unlocking upon opening of the flip cover is set based on a detected opening or closing state of the holster or a detected opening or closing state of the flip cover.

The acceleration sensor 180E may detect magnitude of accelerations in various directions (usually on three axes) of the electronic device. When the electronic device is still, a value and a direction of gravity may be detected. The acceleration sensor 180E may further be configured to identify a posture of the electronic device, and is used in an application such as switching between a landscape mode and a portrait mode or a pedometer.

The distance sensor 180F is configured to measure a distance. The electronic device may measure the distance in an infrared manner or a laser manner. In some embodiments, in a photographing scenario, the electronic device may measure a distance by using the distance sensor 180F, to implement quick focusing.

The fingerprint sensor 180G is configured to collect a fingerprint. The electronic device may use a feature of the collected fingerprint to implement fingerprint-based unlocking, application lock access, fingerprint-based photographing, fingerprint-based call answering, and the like.

The temperature sensor 180H is configured to detect a temperature. In some embodiments, the electronic device executes a temperature processing policy by using the temperature detected by the temperature sensor 180. For example, when the temperature reported by the temperature sensor 180H exceeds a threshold, the electronic device degrades performance of a processor near the temperature sensor 180H, to reduce power consumption and implement thermal protection. In some other embodiments, when the temperature is lower than another threshold, the electronic device heats up the battery 142, to avoid abnormal shutdown of the electronic device due to a low temperature. In some other embodiments, when the temperature is lower than still another threshold, the electronic device boosts an output voltage of the battery 142 to avoid abnormal shutdown due to a low temperature.

The touch sensor 180I is also referred to as a "touch panel". The touch sensor 180I may be disposed in the display 194, and the touch sensor 180I and the display 194 form a touchscreen. The touch sensor 180K is configured to detect a touch operation performed on or near the touch sensor 180I. The touch sensor 180I may transfer the detected touch operation to the application processor, to determine a type of a touch event. A visual output related to the touch operation may be provided on the display 194. In some other embodiments, the touch sensor 180I may alternatively be disposed on a surface of the electronic device at a position different from that of the display 194.

The bone conduction sensor 180J may obtain a vibration signal. In some embodiments, the bone conduction sensor 180J may obtain a vibration signal of a vibration bone of a human vocal part. The bone conduction sensor 180J may also be in contact with a human pulse, to receive a blood pressure beating signal. In some embodiments, the bone conduction sensor 180J may also be disposed in the headset, to obtain a bone conduction headset. The audio module 170 may obtain a voice signal through parsing based on the vibration signal that is of the vibration bone of the vocal part and that is obtained by the bone conduction sensor 180J, to implement a voice function. The application processor may parse heart rate information based on the blood pressure beating signal obtained by the bone conduction sensor 180J, to implement a heart rate detection function.

The button 190 includes a power button, a volume button, and the like. The button 190 may be a mechanical button or a touch button. The electronic device may receive a key input, and generate a key signal input related to user settings and function control of the electronic device.

The motor 191 may generate a vibration prompt. The motor 191 may be used for an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. A touch vibration feedback effect may further be custom.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device. The electronic device may support one or N SIM card interfaces, and N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device interacts with a network by using the SIM card, to implement functions such as a call and data communication. In some embodiments, the electronic device uses an eSIM card, namely, an embedded SIM card. The eSIM card may be embedded into the electronic device, and cannot be detached from the electronic device.

All methods in the following embodiments may be implemented in the electronic device having the foregoing hardware structure.

The method in the embodiments of this application is described below by using an example in which the electronic device is a mobile phone and the mobile phone includes a ToF sensor, a proximity sensor, and an ambient light sensor. With reference to FIG. 1, the ToF sensor 101, the proximity sensor 102, and the ambient light sensor 103 are located on a same side of the mobile phone, for example, on a front of the mobile phone. If a light sensor (for example, the proximity sensor 102 and/or the ambient light sensor 103) is also turned on when the ToF sensor 101 is turned on, an infrared light pulse emitted by the ToF sensor 101 affects accuracy of data measured by the light sensor.

In the following case 1, the ToF sensor 101 of the mobile phone is turned on: a case 1-1: A photographing function is implemented by using a front-facing camera (for example, the camera 104 shown in FIG. 1): a case 1-2: Unlocking is performed by using a 3D face unlocking function; and the like.

In the following case 2, the proximity sensor 102 of the mobile phone is turned on: a case 2-1: A call is made by using the mobile phone; a case 2-2: A pocket mode is enabled; a case 2-3: A holster mode is enabled; a case 2-4: The mobile phone is in a screen-on state (including a screen-on state that exists when the mobile phone is locked and a screen-on state that exists after the mobile phone is unlocked); a case 2-5: The mobile phone is locked, and is in a screen-off state, and time is displayed; a case 2-6: There is an incoming call for the mobile phone; and the like.

In the following case 3, the ambient light sensor 103 of the mobile phone is turned on: a case 3-1: The mobile phone is in the screen-on state (including the screen-on state that exists when the mobile phone is locked and the screen-on state that exists after the mobile phone is unlocked); and a case 3-2: The photographing function is implemented by using a camera (the front-facing camera or a rear-facing camera).

It may be understood that when either case in the case 1 and any case in the case 2 simultaneously occur, the ToF sensor 101 and the proximity sensor 102 may be simultaneously turned on. When either case in the case 1 and either case in a case 3 simultaneously occur, the ToF sensor 101 and the ambient light sensor 103 may be simultaneously turned on. When either case in the case 1, any case in the case 2, and either case in the case 3 simultaneously occur, the ToF sensor 101, the proximity sensor 102, and the ambient light sensor 103 may be simultaneously turned on.

In some embodiments of this application, if the light sensor (for example, the proximity sensor 102 and/or the ambient light sensor 103) is also turned on when the ToF sensor 101 is turned on, the mobile phone may control the light sensor to be turned off. When the ToF sensor 101 is turned off the mobile phone may control the light sensor to be turned on again. In other words, when the ToF sensor 101 is turned on, the light sensor is controlled to be turned off, and when the ToF sensor 101 is turned off, the light sensor is controlled to be turned on, to avoid a case in which the infrared light pulse emitted by the ToF sensor 101 affects accuracy of the data measured by the light sensor.

In a possible implementation, the mobile phone (for example, the processor 110 shown in FIG. 2) may obtain a working status (the working status may be on or off) of the ToF sensor 101 by using a hardware solution, and then control, based on the working status of the ToF sensor 101, the light sensor to be turned off or turned on. To be specific, when the ToF sensor 101 is turned on, the processor 110 of the mobile phone controls the light sensor to be turned off, and when the ToF sensor 101 is turned off, the processor 110 of the mobile phone controls the light sensor to be turned on.

The processor 110 of the mobile phone is separately communicatively connected to the ToF sensor 101, the proximity sensor 102, and the ambient light sensor 103 of the mobile phone.

Figure 8:
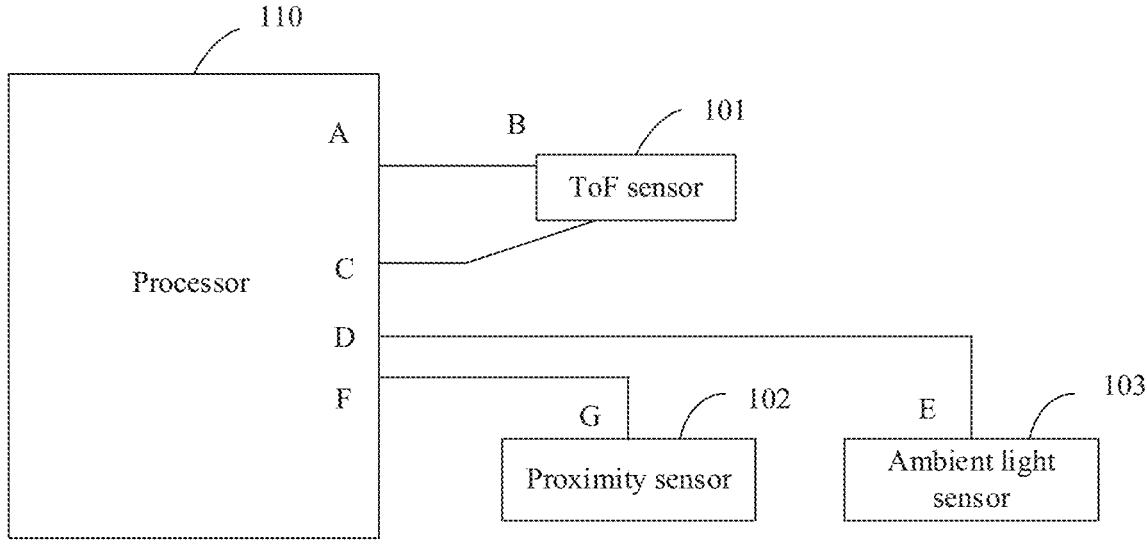
FIG. 8 is a schematic diagram of connection between a processor and a sensor according to an embodiment of this application.

For example, the processor 110 may be separately coupled to the ToF sensor 101, the proximity sensor 102, and the ambient light sensor 103 by using different I2C interfaces. For example, as shown in FIG. 8, the processor 110 is coupled to the ToF sensor 101 by using an I2C interface_AB. The processor 110 is coupled to the ambient light sensor 103 by using an I2C interface_DE (the I2C interface_DE may be a first interface in this application). The processor 110 is coupled to the proximity sensor 102 by using an I2C interface_FG (the I2C interface_FG may be a second interface in this application). The processor 110 may communicate with the corresponding sensors by using the different I2C interfaces. For example, when the ToF sensor 101 is turned on, the ToF sensor 101 may output a detected round trip time of flight of the infrared light pulse to the processor 110 by using the I2C interface_AB. For another example, when the ambient light sensor 103 is turned on, the ambient light sensor 103 may output measured light intensity of four channels in ambient light to the processor 110 by using the I2C interface_DE. For another example, when the proximity sensor 102 is turned on, the proximity sensor 102 may output light intensity of detected infrared reflected light to the processor 110 by using the I2C interface_FG.

The processor 110 may be alternatively coupled to the ToF sensor 101 by using a general-purpose input/output (GPIO) pin (for example, a pin "C" in FIG. 8), to control the ToF sensor 101 to be turned on or turned off. For example, as shown in FIG. 8, the pin "C" of the processor 110 is coupled to a pin ODS_APC_GATE of the ToF sensor 101. The processor 110 may output a high level to the pin ODS_APC_GATE of the ToF sensor 101 by using the pin "C". In this way, a level of the pin ODS_APC_GATE of the ToF sensor 101 changes from a low level to a high level, and the ToF sensor 101 is turned on. The processor 110 may output a low level to the pin ODS_APC_GATE of the ToF sensor 101 by using the pin "C". In this way, a level of the pin ODS_APC_GATE of the ToF sensor 101 changes from a high level to a low level, and the ToF sensor 101 is turned off. When the ToF sensor 101 is turned on, the ToF sensor 101 emits the infrared light pulse to the outside.

In this embodiment of this application, to prevent the infrared light pulse emitted when the ToF sensor 101 is turned on from affecting accuracy of the data measured by the light sensor, when the processor 110 controls the ToF sensor 101 to be turned on, for example, outputs a high level to the pin ODS_APC_GATE of the ToF sensor 101 by using the pin "C", if the light sensor is turned on in this case, the processor 110 may control the light sensor to be turned off. In some embodiments, the processor 110 may control, by using an I2C interface between the processor 110 and the light sensor, the light sensor to be turned off. For example, when the processor 110 outputs a high level to the pin ODS_APC_GATE of the ToF sensor 101 by using the pin "C", if the proximity sensor 102 is turned on in this case, the processor may control, by using the I2C interface _FG between the processor and the proximity sensor 102, the proximity sensor 102 to be turned off. For another example, when the processor 110 outputs a high level to the pin ODS_APC_GATE of the ToF sensor 101 by using the pin "C", if the ambient light sensor 103 is turned on in this case, the processor may control, by using the I2C interface_DE between the processor and the ambient light sensor 103, the ambient light sensor 103 to be turned off.

When the processor 110 controls the ToF sensor 101 to be turned off for example, outputs a low level to the pin ODS_APC_GATE of the ToF sensor 101 by using the pin "C", the processor 110 may control the light sensor to be turned on again. In some embodiments, the processor 110 may control, by using the I2C interface between the processor 110 and the light sensor, the light sensor to be turned on. For example, when the processor 110 outputs a low level to the pin ODS_APC_GATE of the ToF sensor 101 by using the pin "C", the processor may control, by using the I2C interface_FG between the processor and the proximity sensor 102, the proximity sensor 102 to be turned on again. For another example, when the processor 110 outputs a low level to the pin ODS_APC_GATE of the ToF sensor 101 by using the pin "C", the processor may control, by using the I2C interface_DE between the processor and the ambient light sensor 103, the ambient light sensor 103 to be turned on again.

For example, with reference to FIG. 1 and FIG. 8, when a user takes a photo by using the front-facing camera, namely, the camera 104, of the mobile phone, the processor 110 outputs a high level to the pin ODS_APC_GATE of the ToF sensor 101 by using the pin "C", to control the ToF sensor 101 to be turned on. It may be understood that when the user takes a photo, the mobile phone is in the screen-on state. In the screen-on state, the proximity sensor 102 of the mobile phone is turned on. Therefore, the processor 110 may further control, by using the I2C interface_FG between the processor 110 and the proximity sensor 102, the proximity sensor 102 to be turned off. In the screen-on state, the ambient light sensor 103 of the mobile phone is also turned on. Therefore, the processor 110 may further control, by using the I2C interface_DE between the processor 110 and the ambient light sensor 103, the ambient light sensor 103 to be turned off. In this way, a case in which a corresponding function of the mobile phone is unintentionally triggered can be avoided. For example, a case in which the mobile phone automatically turns off a screen because the mobile phone mistakenly determines, based on relatively high light intensity measured by the proximity sensor 102, that there is an object near the mobile phone is avoided. For another example, a case in which eye irritation occurs because the mobile phone increases screen brightness of the mobile phone in a dark environment based on relatively high light intensity measured by the ambient light sensor 103 is avoided.

Certainly, when the processor 110 outputs a low level to the pin ODS_APC_GATE of the ToF sensor 101 by using the pin "C", to control the ToF sensor 101 to be turned off, if the mobile phone is still in the screen-on state, the processor 110 may control, by using the I2C interface_FG between the processor 110 and the proximity sensor 102, the proximity sensor 102 to be turned on again, and control, by using the I2C interface_DE between the processor 110 and the ambient light sensor 103, the ambient light sensor 103 to be turned on again.

In the technical solution, the working status of the ToF sensor 101 is obtained by using the hardware solution, so that when the ToF sensor 101 is turned on, the light sensor may be controlled to be turned off, and when the ToF sensor 101 is turned off, the light sensor may be controlled to be turned on again. In this way, a problem that accuracy of the data measured by the light sensor is affected because the infrared light pulse emitted when the ToF sensor 101 is turned on hits the light sensor after being reflected by an object can be avoided. Therefore, a case in which the corresponding function of the mobile phone is unintentionally triggered is avoided, and user experience is improved.

In another possible implementation, with reference to FIG. 1, the mobile phone may obtain an enabling status (the enabling status may be enabled or not enabled) of the ToF sensor 101 by using a software solution, and then the mobile phone controls, based on the enabling state of the ToF sensor 101, the light sensor to be turned off or turned on. That is, when the ToF sensor 101 is enabled, the mobile phone controls the light sensor to be turned off, and when the ToF sensor 101 is not enabled, the mobile phone controls the light sensor to be turned on. When the ToF sensor 101 is enabled, the ToF sensor 101 may emit the infrared light pulse in a mode (for example, a mode 1 or a mode 2) shown in FIG. 10. When the ToF sensor 101 is not enabled or after the ToF sensor 101 is disabled, the ToF sensor 101 does not emit the infrared light pulse.

Figure 9:
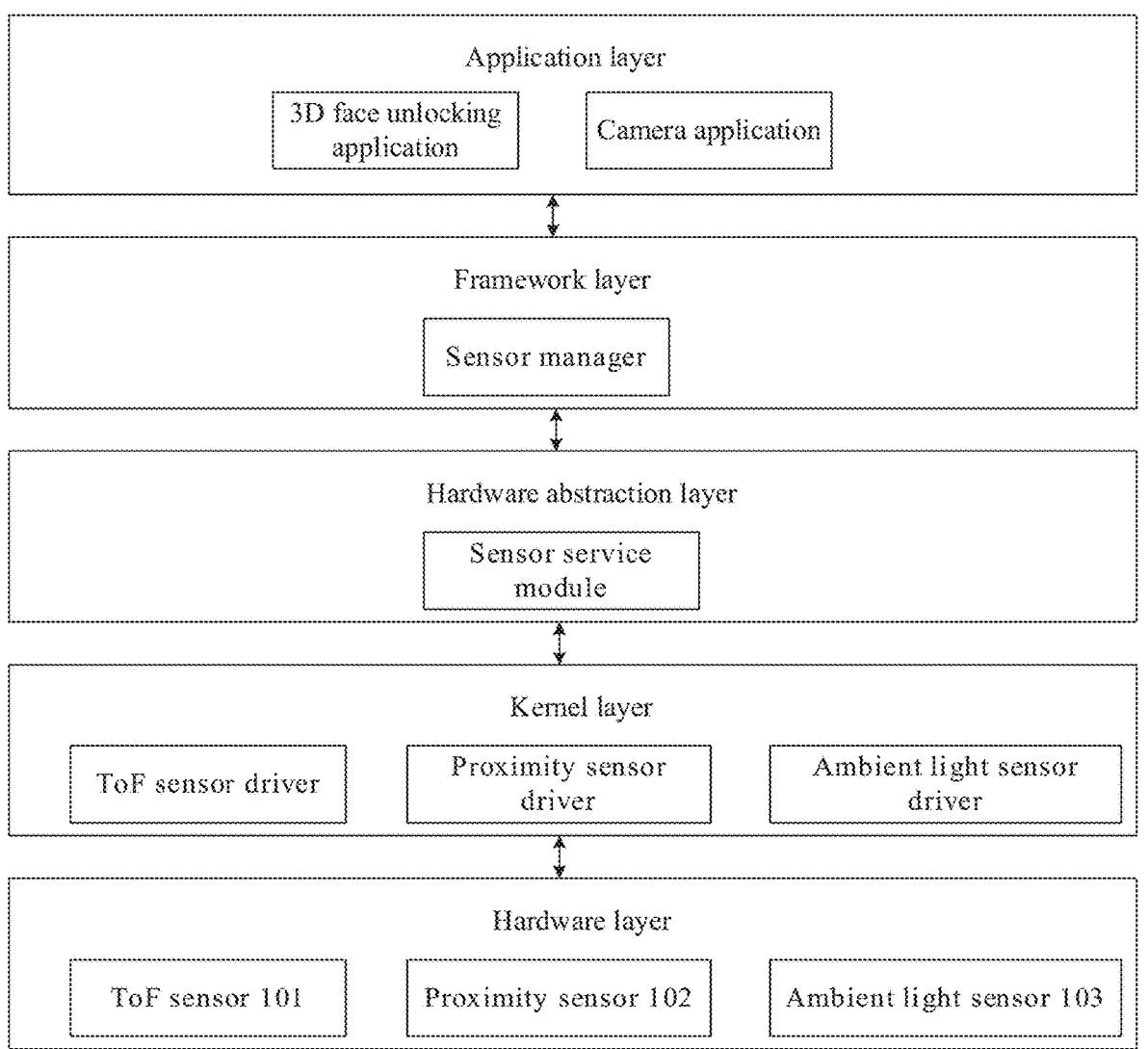
FIG. 9 is a schematic diagram of a software architecture of an Android operating system-based mobile phone according to an embodiment of this application.

In an example, FIG. 9 is a schematic diagram of a software architecture of an ANDROID operating system-based mobile phone according to an embodiment. As shown in FIG. 9, the software architecture may include an application layer, a framework layer, a hardware abstraction layer (HAL), a kernel layer, and a hardware layer (hardware layer).

The application layer is a layer for interacting with the user. The application layer may include various applications (for example, a third-party application and/or a system application) of the mobile phone. For example, in this embodiment, the application layer may include a 3D face unlocking application and a camera application. When the user opens the applications, the mobile phone may control the ToF sensor 101 at the hardware layer of the mobile phone to be enabled, to assist the application in implementing a corresponding function. For example, when the user opens the 3D face unlocking application, the mobile phone may control the ToF sensor 101 of the mobile phone to be enabled, so that a 3D face image may be generated by using data measured by the ToF sensor 101, to implement the 3D face unlocking function. For another example, when the user opens the camera application, the mobile phone may control the ToF sensor 101 of the mobile phone to be enabled, so that a depth of field may be determined by using data measured by the ToF sensor 101, to implement bokeh during implementation of the photographing function.

The framework layer includes a library function. The library function provides various application programming interfaces (application programming interface, API) that may be used to build applications. For a sensor hardware circuit, the framework layer provides a sensor manager (manager), configured to manage the sensor (for example, the ToF sensor 101, the proximity sensor 102, and the ambient light sensor 103) hardware circuit.

The hardware abstraction layer abstracts the hardware circuit, provides the abstract hardware circuit for the framework layer, and provides a standard writing or control interface for a driver at the kernel layer. A manufacture may provide a driver for the hardware circuit based on the standard writing or control interface. For example, the ToF sensor, the proximity sensor, and the ambient light sensor at the hardware layer may be virtualized as sensor service modules.

The kernel layer provides the driver for controlling the hardware circuit at the hardware layer, and the driver is usually implemented by the manufacturer of the hardware circuit based on the standard interface provided by the hardware abstraction layer. For example, the kernel layer includes a ToF sensor driver, a proximity sensor driver, and an ambient light sensor driver. The ToF sensor driver is configured to control the ToF sensor. The proximity sensor driver is configured to control the proximity sensor. The ambient light sensor driver is configured to control the ambient light sensor. The ToF sensor driver may be a first driver in this application. The ambient light sensor driver may be a second driver in this application. The proximity sensor driver may be a third driver in this application.

The hardware layer includes components such as the ToF sensor 101, the proximity sensor 102, and the ambient light sensor 103.

In this embodiment of this application, when the application layer of the mobile phone receives an operation of opening an application, if the application needs the ToF sensor 101 to assist in implementing a corresponding function, the application layer sends a command 1 to the sensor manager at the framework layer. The command 1 may be a first command in this application.

After receiving the command 1, the sensor manager at the framework layer may deliver the command 1 to the ToF sensor driver, the proximity sensor driver, and the ambient light sensor driver at the kernel layer by using the sensor service modules at the hardware abstraction layer.

After receiving the command 1, the ToF sensor driver at the kernel layer may control the ToF sensor 101 at the hardware layer to be enabled.

After the proximity sensor driver at the kernel layer receives the command 1, if the proximity sensor 102 at the hardware layer is turned on in this case, the proximity sensor 102 may be controlled to be turned off.

After the ambient light sensor driver at the kernel layer receives the command 1, if the ambient light sensor 103 at the hardware layer is turned on in this case, the ambient light sensor 103 may be controlled to be turned off.

When the application exits, that is, the ToF sensor 101 needs to be controlled to be disabled, the application layer sends a command 2 to the sensor manager at the framework layer. The command 2 may be a second command in this application.

After receiving the command 2, the sensor manager at the framework layer may deliver the command 2 to the ToF sensor driver, the proximity sensor driver, and the ambient light sensor driver at the kernel layer by using the sensor service modules at the hardware abstraction layer.

After receiving the command 2, the ToF sensor driver at the kernel layer may control the ToF sensor 101 at the hardware layer to be disabled.

After receiving the command 2, the proximity sensor driver at the kernel layer may control the proximity sensor 102 to be turned on again.

After receiving the command 2, the ambient light sensor driver at the kernel layer may control the ambient light sensor 103 to be turned on again.

It may be understood that in some embodiments, the command 1 may be a command, and the command is used to enable the ToF sensor 101. The proximity sensor driver may control, based on the command, the proximity sensor 102 to be turned off, and the ambient light sensor driver may control, based on the command, the ambient light sensor 103 to be turned off. In some other embodiments, the command 1 may be a command, and the command is used to enable the ToF sensor 101, and is further used to control the proximity sensor 102 and the ambient light sensor 103 to be turned off. In other words, the command may be used to enable the ToF sensor 101, and control the proximity sensor 102 and the ambient light sensor 103 to be turned off. In some other embodiments, the command 1 may be a set of a plurality of commands, one of the plurality of commands may be used to enable the ToF sensor 101, and one or more of the plurality of commands may be used to control the proximity sensor 102 and the ambient light sensor 103 to be turned off.

Similarly, in some embodiments, the command 2 may be a command, and the command is used to disable the ToF sensor 101. The proximity sensor driver may control, based on the command, the proximity sensor 102 to be turned on, and the ambient light sensor driver may control, based on the command, the ambient light sensor 103 to be turned on. In some other embodiments, the command 2 may be a command, and the command is used to disable the ToF sensor 101, and is further used to control the proximity sensor 102 and the ambient light sensor 103 to be turned on again. In other words, the command may be used to disable the ToF sensor 101, and control the proximity sensor 102 and the ambient light sensor 103 to be turned on again. In some other embodiments, the command 2 may be a set of a plurality of commands, one of the plurality of commands may be used to disable the ToF sensor 101, and one or more of the plurality of commands may be used to control the proximity sensor 102 and the ambient light sensor 103 to be turned on again.

For example, with reference to FIG. 1 and FIG. 9, when the user performs unlocking by using the 3D face unlocking function of the mobile phone, the mobile phone automatically opens the 3D face unlocking application of the mobile phone. The 3D face unlocking application needs the ToF sensor 101 to assist in generating a 3D face image, to complete the unlocking function. When the user performs unlocking by using the 3D face unlocking function of the mobile phone, the mobile phone is in the screen-on state. In the screen-on state, the proximity sensor 102 of the mobile phone is turned on, and the ambient light sensor 103 is also turned on. Therefore, after the mobile phone opens the 3D face unlocking application of the mobile phone, the application layer of the mobile phone sends the command 1 to the sensor manager at the framework layer. After receiving the command 1, the sensor manager at the framework layer delivers the command 1 to the ToF sensor driver, the proximity sensor driver, and the ambient light sensor driver at the kernel layer by using the sensor service modules at the hardware abstraction layer. The ToF sensor driver at the kernel layer controls, based on the command 1, the ToF sensor 101 at the hardware layer to be enabled. The proximity sensor driver at the kernel layer controls, based on the command 1, the proximity sensor 102 to be turned off. The ambient light sensor driver at the kernel layer controls, based on the command 1, the ambient light sensor 103 to be turned off. In this way, a case in which a corresponding function of the mobile phone is unintentionally triggered can be avoided.

After 3D face unlocking is completed, the application layer of the mobile phone may send the command 2 to the sensor manager at the framework layer. After receiving the command 2, the sensor manager at the framework layer delivers the command 2 to the ToF sensor driver, the proximity sensor driver, and the ambient light sensor driver at the kernel layer by using the sensor service modules at the hardware abstraction layer. The ToF sensor driver at the kernel layer may control, based on the command 2, the ToF sensor 101 at the hardware layer to be disabled. The proximity sensor driver at the kernel layer controls, based on the command 2, the proximity sensor 102 to be turned on again. The ambient light sensor driver at the kernel layer controls, based on the command 2, the ambient light sensor 103 to be turned on again.

In the technical solution, the enabling status of the ToF sensor 101 is obtained by using the software solution, so that when the ToF sensor 101 is enabled, the light sensor may be controlled to be turned off, and when the ToF sensor 101 is not enabled, the light sensor may be controlled to be turned on again. In this way, a problem that accuracy of the data measured by the light sensor is affected because the infrared light pulse emitted when the ToF sensor 101 is turned on hits the light sensor after being reflected by an object can be avoided. Therefore, a case in which the corresponding function of the mobile phone is unintentionally triggered is avoided, and user experience is improved.

In some other embodiments of this application, if the light sensor (for example, the proximity sensor 102 and/or the ambient light sensor 103) is also turned on when the ToF sensor 101 is turned on, the mobile phone (for example, the processor of the mobile phone) may discard data measured by the light sensor when the ToF sensor 101 is turned on. In other words, the processor of the mobile phone uses data measured by the light sensor when the ToF sensor 101 is turned off, to avoid a case in which the infrared light pulse emitted by the ToF sensor 101 affects accuracy of the data measured by the light sensor.

In an example, the processor (for example, the processor 110 in FIG. 2) of the mobile phone may monitor a percentage of an infrared (IR) component in ambient light by using light intensity that is of four channels in the ambient light and that is output by the ambient light sensor 103. If the processor 110 of the mobile phone determines that the percentage of the IR component in the ambient light is greater than a threshold, it may be considered that the ToF sensor 101 is turned on, and there is interference from the infrared light pulse. In this case, the processor 110 of the mobile phone may discard the data output by the ambient light sensor 103. If the processor 110 of the mobile phone determines that the percentage of the IR component in the ambient is less than the threshold, it may be considered that the ToF sensor 101 is turned off in this case, and there is no interference from the infrared light pulse. In this case, the processor 110 of the mobile phone may use the data output by the ambient light sensor 103 as data for implementing a corresponding function (the function may be a first function in this application, and for example, the first function may be automatically adjusting screen brightness) of the mobile phone.

In addition, if the processor 110 of the mobile phone determines that the percentage of the IR component in the ambient is greater than the threshold, it is determined that the ToF sensor 101 is turned on, and the processor 110 of the mobile phone also discards data (for example, measured light intensity of infrared reflected light) reported by the proximity sensor 102, in other words, discards the data output by the proximity sensor 102. If the processor 110 of the mobile phone determines that the percentage of the IR component in the ambient is less than the threshold, it is determined that the ToF sensor 101 is turned off, and the processor 110 of the mobile phone may use data reported by the proximity sensor 102 as data for implementing a corresponding function (the function may be a second function in this application, and for example, the second function may be determining whether there is an object near the mobile phone) of the mobile phone.

In some embodiments, the processor 110 of the mobile phone may determine light intensity of IR in the ambient light based on the following formula (1) or (2).

The formula (1) is $IR=(R+G+B-C)/2$, and the formula (2) is $IR=C-(R+G+B)$, where IR represents the light intensity of the IR in the ambient light, R represents light intensity of an R channel in the ambient light, G represents light intensity of a G channel in the ambient light, B represents light intensity of a B channel in the ambient light, and C represents light intensity of a C channel in the ambient light.

The percentage of the IR component may be equal to a ratio of the light intensity of the IR to the light intensity of the C channel. Usually, when the ToF sensor 101 is turned on, the ratio of the light intensity of the IR to the light intensity of the C channel, namely, the percentage of the IR component, is increased. In this embodiment, when it is determined that the percentage of the IR component is greater than the threshold, it may be determined that the ToF sensor 101 is turned on, and the data measured by the light sensor is discarded. When the percentage of the IR component is less than the threshold, it is determined that the ToF sensor 101 is turned off, and the data measured by the light sensor is used as the data for implementing the corresponding function of the mobile phone. The threshold may vary with performance of the ambient light sensor 103. For example, the threshold may be 60%. For another example, the threshold may be 90%.

For example, when the user uses the 3D face unlocking function of the mobile phone or takes a photo by using the front-facing camera of the mobile phone, the processor 110 of the mobile phone may control the ToF sensor 101 to be turned on. When the user uses the 3D face unlocking function of the mobile phone or takes a photo, the mobile phone is in the screen-on state. In the screen-on state, both the proximity sensor 102 and the ambient light sensor 103 of the mobile phone are turned on. In this embodiment, the processor 110 of the mobile phone may monitor the percentage of the IR component in the ambient light by using the data output by the ambient light sensor 103. When it is determined that the percentage of the IR component is greater than the threshold, the data output by the ambient light sensor 103 and the data output by the proximity sensor 102 are discarded. When it is determined that the percentage of the IR component is less than the threshold, the data output by the ambient light sensor 103 and the data output by the proximity sensor 102 are used to implement the corresponding functions of the mobile phone. In this way, a case in which the corresponding function of the mobile phone is unintentionally triggered can be avoided.

In the technical solution, the percentage of the IR component in the ambient light is monitored, to determine whether to turn on or turn off the ToF sensor 101, and then the data measured by the light sensor when the ToF sensor 101 is turned on may be discarded, and the data measured by the light sensor when the ToF sensor 101 is turned off may be used. In this way, a case in which the corresponding function of the mobile phone is unintentionally triggered can be avoided, and user experience is improved.

Figure 10:
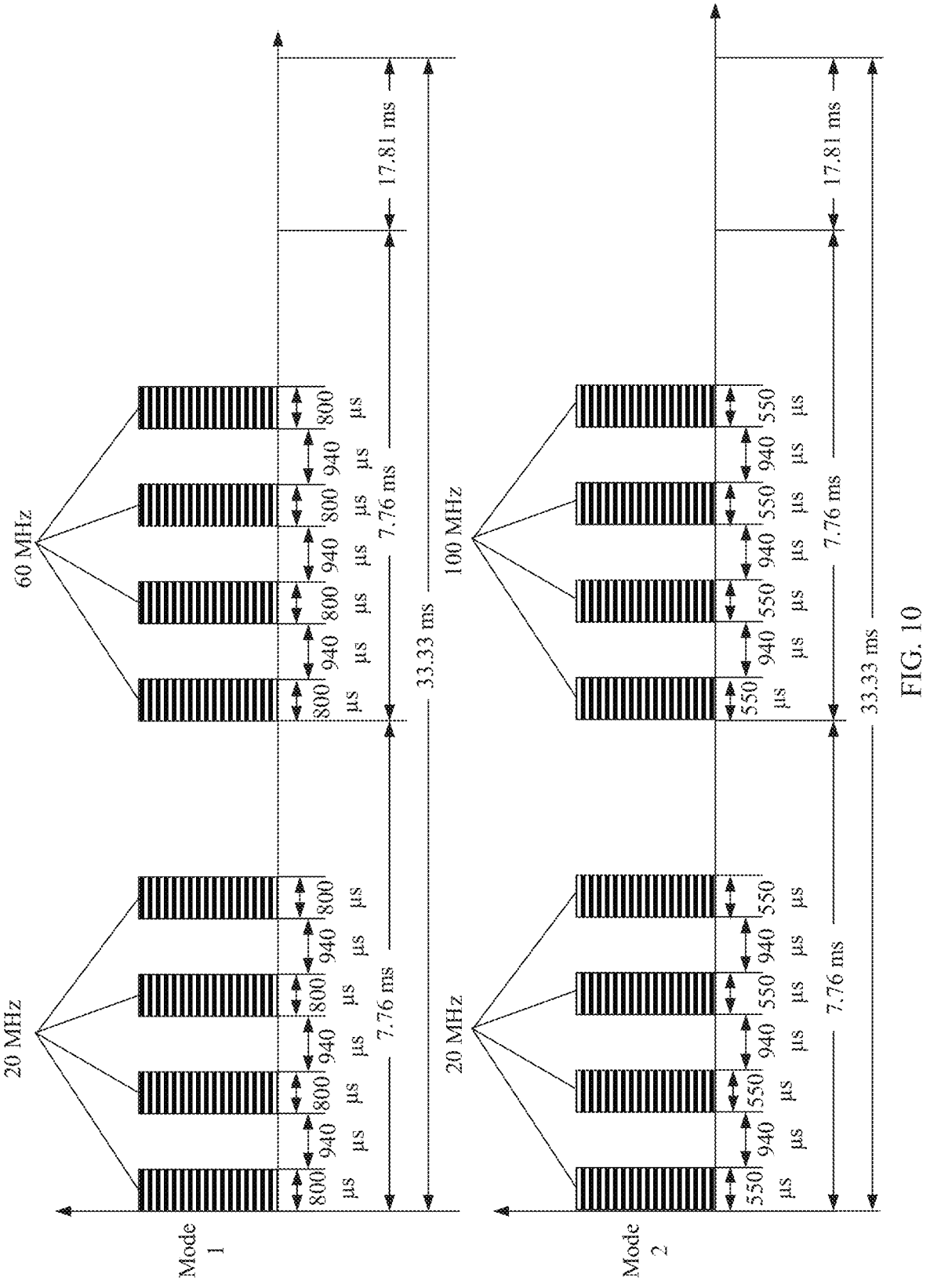
FIG. 10 is a schematic diagram of an emission mode of a ToF sensor according to an embodiment of this application.

In addition, FIG. 10 shows two modes such as the mode 1 and the mode 2 in which the ToF sensor 101 emits the infrared light pulse. In either of the two modes, an emission frequency of the ToF sensor 101 is 30 hertz (Hz), in other words, an emission period is 33.33 milliseconds (ms). Each emission period includes eight high-frequency infrared light pulses. In different modes, the last four high-frequency infrared light pulses are emitted at different frequencies. For example, in the mode 1, the last four high-frequency infrared light pulses are emitted at a frequency of 60 megahertz (MHz). In the mode 2, the last four high-frequency infrared light pulses are emitted at a frequency of 100 MHz. All of the first four high-frequency infrared light pulses are emitted at a frequency of 20 MHz. In FIG. 10, a high level indicates that the ToF sensor 101 is turned on, in other words, emits the high-frequency infrared light pulse, and a low level indicates that the ToF sensor 101 is turned off. That is, in an emission period, the ToF sensor 101 needs to be turned on for eight times and turned off for eight times.

In the embodiment in which impact on the light sensor is corrected by using the hardware synchronization solution, with reference to FIG. 10, in each emission period, the light sensor may be turned off when the ToF sensor 101 is turned on, in other words, when there is a time period indicated by a high level, and the light sensor may be turned on when the ToF sensor 101 is turned off, in other words, when there is a time period indicated by a low level. The mode 1 shown in FIG. 10 is used as an example. In an emission period, the ToF sensor 101 is turned on and the light sensor is turned off in each time period of 800 microseconds (μs) shown in FIG. 10, and the ToF sensor 101 is turned off and the light sensor is turned on in another time period.

In the embodiment in which impact on the light sensor is corrected by monitoring the percentage of the IR component in the ambient light, with reference to FIG. 10, in each emission period, the mobile phone discards the data measured when the ToF sensor 101 is turned on, in other words, when there is a time period indicated by a high level, and uses the data measured by the light sensor when the ToF sensor 101 is turned off, in other words, when there is a time period indicated by a low level. The mode 2 shown in FIG. 10 is used as an example. In an emission period, the mobile phone discards data measured by the light sensor in each time period of 550 μs shown in FIG. 10, and uses data measured by the light sensor in another time period.

In addition, in the foregoing embodiment of this application, how to correct the impact on the light sensor is described by using an example in which accuracy of the data measured by the light sensor is affected when the ToF sensor 101 is turned on. In some other embodiments, another device disposed on a same side of the electronic device as the light sensor may affect the data measured by the light sensor, for example, an IR strobe light disposed on the same side of the electronic device as the light sensor. The IR strobe light may be configured to provide fill-in light for a face when face unlocking is performed in a dark environment. In these embodiments, impact of the device on the light sensor may also be corrected by using the method provided in this embodiment of this application. For example, the embodiment in which impact on the light sensor is corrected by using the software synchronization solution or the embodiment in which impact on the light sensor is corrected by monitoring the percentage of the IR component in the ambient light may be used. Specific implementation is similar to implementation of the embodiment. Details are not described one by one in this embodiment.

Figure 11:
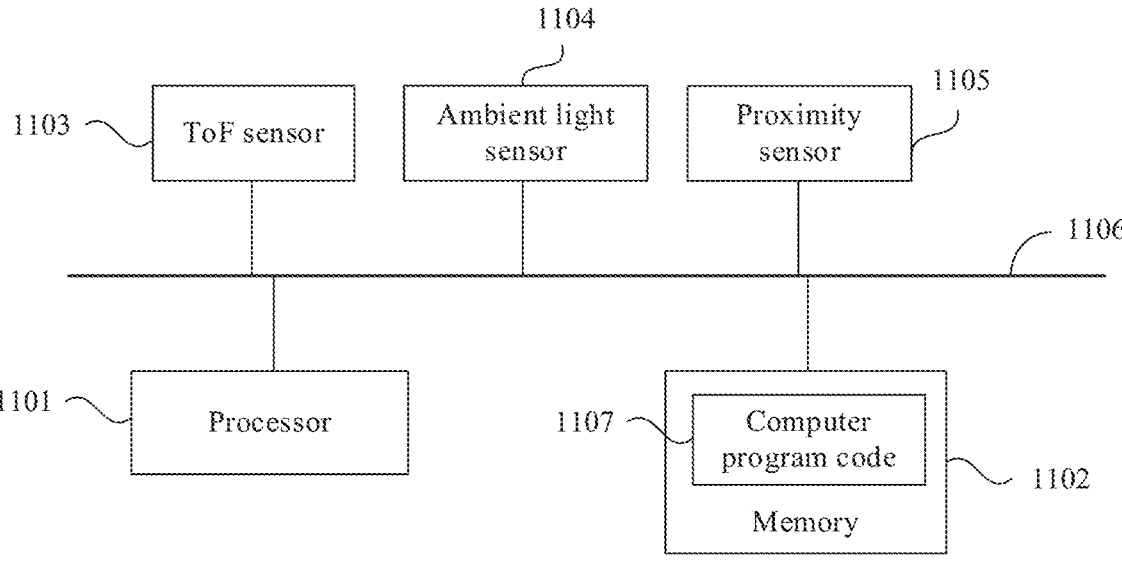
FIG. 11 is a schematic diagram of an electronic device according to an embodiment of this application.

Some other embodiments of this application further provide an electronic device. As shown in FIG. 11, the electronic device may include one or more processors 1101, a memory 1102, a ToF sensor 1103, an ambient light sensor 1104, and a proximity sensor 1105. The ToF sensor 1103, the ambient light sensor 1104, and the proximity sensor 1105 are located on a same side of the electronic device. The foregoing components may be connected through one or more communications buses 1106. The memory 1102 may be configured to store one or more pieces of computer program code 1107. The one or more pieces of computer program code 1107 include computer instructions. When the computer instructions are executed by the electronic device, the electronic device is enabled to perform the functions or steps performed by the electronic device (for example, the mobile phone) in the foregoing embodiments.

An embodiment of this application further provides a computer storage medium. The computer storage medium includes computer instructions. When the computer instructions are run on an electronic device, the electronic device is enabled to perform the functions or steps performed by the electronic device in the foregoing embodiments.

An embodiment of this application further provides a computer program product. When the computer program product is run on a computer, the computer is enabled to perform the functions or steps performed by the electronic device in the foregoing method embodiments.

It may be understood that the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device comprising: a first side; a time of flight (ToF) sensor located on the first side; an ambient light sensor located on the first side; a proximity sensor located on the first side; and a processor coupled to the ToF sensor, the ambient light sensor, and the proximity sensor and configured to: control the ambient light sensor and the proximity sensor to be turned off when the ToF sensor is turned on, wherein the ToF sensor is turned on when a percentage of an infrared component in ambient light output by the ambient light sensor is greater than a threshold; and control the ambient light sensor and the proximity sensor to be turned on when the ToF sensor is turned off, wherein the ToF sensor is turned off when the percentage is less than the threshold.

2. The electronic device of claim 1, wherein the processor is further coupled to the ToF sensor by a general-purpose input/output (GPIO) pin, wherein the processor is further coupled to the ambient light sensor by a first interface, wherein the processor is further coupled to the proximity sensor by a second interface, and wherein the processor is further configured to:

output a first level to the ToF sensor using the GPIO pin to control the ToF sensor to be turned on;

further control, using the first interface, the ambient light sensor to be turned off in response to outputting the first level to the ToF sensor; and further control, using the second interface, the proximity sensor to be turned off.

3. The electronic device of claim 2, wherein the processor is further configured to:

output a second level to the ToF sensor using the GPIO pin to control the ToF sensor to be turned off; and in response to outputting the second level to the ToF sensor using the GPIO pin:

further control, using the first interface, the ambient light sensor to be turned on; and further control, using the second interface, the proximity sensor to be turned on.

4. The electronic device of claim 1, wherein the ToF sensor is enabled to emit an infrared light pulse when the ToF sensor is turned on.

5. The electronic device of claim 1, wherein the processor is further configured to:

when an application needs the ToF sensor to assist in implementing a function:

generate a first command; and control, based on the first command and using a first driver of the ToF sensor, the ToF sensor to be enabled;

further control, based on the first command and using a second driver of the ambient light sensor, the ambient light sensor to be turned off; and further control, based on the first command and using a third driver of the proximity sensor, the proximity sensor to be turned off.

6. The electronic device of claim 5, wherein the processor is further configured to:

when the application exits:

generate a second command; and control, based on the second command and using the first driver, the ToF sensor to be disabled; and after the ToF sensor is disabled:

further control, based on the second command and using the second driver, the ambient light sensor to be turned on; and further control, based on the second command and using the third driver, the proximity sensor to be turned on.

7. The electronic device of claim 1, wherein the ToF sensor is not enabled to emit an infrared light pulse when the ToF sensor is turned off.

8. A method implemented by an electronic device, wherein the method comprises: controlling an ambient light sensor of the electronic device and a proximity sensor of the electronic device to be turned off when a time of flight (ToF) sensor of the electronic device is turned on, wherein the ToF sensor is turned on when a percentage of an infrared component in ambient light output by the ambient light sensor is greater than a threshold, and wherein the ToF sensor, the ambient light sensor, and the proximity sensor are located on a same side of the electronic device; and controlling the ambient light sensor and the proximity sensor to be turned on when the ToF sensor is turned off, wherein the ToF sensor is turned off when the percentage is less than the threshold.

9. The method of claim 8, further comprising:

outputting a first level to the ToF sensor to control the ToF sensor to be turned on; and further controlling the ambient light sensor and the proximity sensor to be turned off in response to outputting the first level to the ToF sensor.

10. The method of claim 8, further comprising:

outputting a second level to the ToF sensor to control the ToF sensor to be turned off; and further controlling the ambient light sensor and the proximity sensor to be turned on in response to outputting the second level to the ToF sensor.

11. The method of claim 8, wherein the ToF sensor is enabled to emit an infrared light pulse when the ToF sensor is turned on.

12. The method of claim 8, further comprising:

when an application needs the ToF sensor to assist in implementing a function:

generating a first command; and controlling, based on the first command and using a first driver of the ToF sensor, the ToF sensor to be enabled;

further controlling, based on the first command and using a second driver of the ambient light sensor, the ambient light sensor to be turned off; and further controlling, based on the first command and using a third driver of the proximity sensor, the proximity sensor to be turned off.

13. The method of claim 12, further comprising:

when the application exits:

generating a second command; and controlling, based on the second command and using the first driver, the ToF sensor to be disabled; and after the ToF sensor is disabled:

further controlling, based on the second command and using the second driver, the ambient light sensor to be turned on; and further controlling, based on the second command and using the third driver, the proximity sensor to be turned on.

14. The method of claim 8, wherein the ToF sensor is not enabled to emit an infrared light pulse when the ToF sensor is turned off.

15. An electronic device comprising:

a first side;

a time of flight (ToF) sensor located on the first side;

an ambient light sensor located on the first side;

a proximity sensor located on the first side; and a processor coupled to the ToF sensor, the ambient light sensor, and the proximity sensor and configured to:

control the ambient light sensor and the proximity sensor to be turned off when the ToF sensor is turned on;

control the ambient light sensor and the proximity sensor to be turned on when the ToF sensor is turned off;

determine a percentage of an infrared component in ambient light based on data output by the ambient light sensor;

determine that the ToF sensor is turned on when the percentage is greater than a threshold; and determine that the ToF sensor is turned off when the percentage is less than the threshold.

16. The electronic device of claim 15, wherein the processor is further coupled to the ToF sensor by a general-purpose input/output (GPIO) pin, wherein the processor is further coupled to the ambient light sensor by a first interface, wherein the processor is further coupled to the proximity sensor by a second interface, and wherein the processor is further configured to:

output a first level to the ToF sensor using the GPIO pin to control the ToF sensor to be turned on;

further control, using the first interface, the ambient light sensor to be turned off in response to outputting the first level to the ToF sensor; and further control, using the second interface, the proximity sensor to be turned off.

17. The electronic device of claim 16, wherein the processor is further configured to:

output a second level to the ToF sensor using the GPIO pin to control the ToF sensor to be turned off; and in response to outputting the second level to the ToF sensor using the GPIO pin:

further control, using the first interface, the ambient light sensor to be turned on; and further control, using the second interface, the proximity sensor to be turned on.

18. A method implemented by an electronic device, wherein the method comprises:

controlling an ambient light sensor of the electronic device and a proximity sensor of the electronic device to be turned off when a time of flight (ToF) sensor of the electronic device is turned on, wherein the ToF sensor, the ambient light sensor, and the proximity sensor are located on a same side of the electronic device;

controlling the ambient light sensor and the proximity sensor to be turned on when the ToF sensor is turned off;

determining a percentage of an infrared component in ambient light based on data output by the ambient light sensor;

determining that the ToF sensor is turned on when the percentage is greater than a threshold; and determining that the ToF sensor is turned off when the percentage is less than the threshold.

19. The method of claim 18, further comprising:

outputting a first level to the ToF sensor to control the ToF sensor to be turned on; and further controlling the ambient light sensor and the proximity sensor to be turned off in response to outputting the first level to the ToF sensor.

20. The method of claim 18, further comprising:

outputting a second level to the ToF sensor to control the ToF sensor to be turned off; and further controlling the ambient light sensor and the proximity sensor to be turned on in response to outputting the second level to the ToF sensor.

* * * * *